United States Patent [19]

Beale

[11] 4,107,776
[45] Aug. 15, 1978

[54] VEHICLE POWER TRANSMISSION ARRANGEMENTS AND ELECTRONIC POWER CONTROLS

[75] Inventor: Julian R. A. Beale, Reigate, England

[73] Assignee: U.S. Philips Corporation, New York, N.Y.

[21] Appl. No.: 771,699

[22] Filed: Feb. 24, 1977

[30] Foreign Application Priority Data

Dec. 22, 1976 [GB] United Kingdom ............... 28896/76
Dec. 22, 1976 [GB] United Kingdom ............... 43598/76
Dec. 22, 1976 [GB] United Kingdom ............... 51430/76

[51] Int. Cl.² .................... B60K 41/18; G06F 15/20
[52] U.S. Cl. .................... 364/431; 74/752 D; 74/866; 364/424; 364/442
[58] Field of Search .................... 235/150.2, 150.21; 74/859, 866, 752 D, 861; 123/32 AE, 32 EA, 102; 364/424, 425, 431, 442

[56] References Cited
U.S. PATENT DOCUMENTS

| | | | |
|---|---|---|---|
| 3,885,472 | 5/1975 | Wakamatsu et al. | 74/866 |
| 3,906,207 | 9/1975 | Rivere et al. | 235/150.2 |
| 3,927,528 | 12/1975 | Van der Kolk et al. | 74/859 X |
| 3,939,738 | 2/1976 | Adey et al. | 74/866 X |
| 4,031,782 | 6/1977 | Miller et al. | 74/866 |

*Primary Examiner*—Joseph F. Ruggiero
*Attorney, Agent, or Firm*—Frank R. Trifari; David R. Treacy

[57] ABSTRACT

An electronically controlled transmission arrangement for an internal combustion engine driven vehicle such as a private automobile, permitting operation under normal conditions close to regions of minimum specific fuel consumption while also permitting bringing an engine in poor operating condition close to its maximum power speed. A transmission including a continuously variable gearing is controlled by an electronic microprocessor in response to signals representing driver-selected power-command, engine-speed, and drive shaft speed. The transmission is controlled so that the engine vehicle combination operates along an engine power-load line selected according to the power command. Transition circuitry prevents a sudden change in power-command from causing the transmission to alter its ratio so quickly that there is a transient change of delivered torque in the wrong direction.

19 Claims, 19 Drawing Figures

VEHICLE POWER TRANSMISSION ARRANGEMENTS AND ELECTRONIC POWER CONTROLS

This invention relates to power arrangements for the propulsion of a wheeled vehicle, comprising an engine and transmission means for coupling the engine to a drive shaft of the vehicle, said transmission means including continuously variable gearing. The engine may be, for example, a petrol- or diesel-fuelled internal combustion engine of a road vehicle. The invention further relates to electronic control means for such power arrangements.

In a power arrangement for the propulsion of a road vehicle, the use of suitable continuously variable gearing (CVG) in the transmission means between an engine and a vehicle drive shaft offers a fuel saving relative to the use of conventional manual gearing. The suitability of the CVG is that it is efficient over a wide ratio and load range so as to permit the engine to be run at its most appropriate speed for the power being used over a wide range of road speeds. A practical power arrangement of the above character embodying CVG in its transmission means requires a control system to adjust automatically the CVG according to power demand and road speed. To achieve this, the control afforded by the control system should be based, directly or indirectly, on target operating points for any set of values of the main parameters such that both engine and CVG are operating satisfactorily at all times. The target operating points should be chosen with reference to the characteristics of both the engine and the CVG since the efficiency and reliability of the CVG depend on it being operated within its normal range. The control strategy for reaching any target operating point should also give a satisfactory transient response when for example the driver by means of an accelerator pedal increases his power demand.

In previously proposed power arrangements including CVG in their transmission means, the control system is usually of the mechanical-hydraulic type, although electronic control systems are now being increasingly considered. Generally the control strategy is based on a fixed relationship between the engine speed and the power transmitted to the drive shaft by the CVG; thus, with increasing actuation of the power-command means (accelerator pedal) by the driver, the transmitted power (which at any stable operating point equals the power produced by the engine) should follow the target operating line for the engine; the extent of actuation of the power-command means determines the operating point on this line. Such a control strategy can function in an acceptable manner for an engine in good condition. However, the engine may be in a poor condition; in a worst case, it may be for example both cold and have an inoperative sparking plug. The maximum power that such a poor engine can produce may be lower than the target operating line except for very low engine speeds. In such a case, the fixed-relationship control strategy would limit the effect of increasing actuation of the power-command means, and as shown more clearly hereinafter, unacceptably low engine power, engine torque and engine speed would result.

According to one aspect of the present invention, there is provided a power arrangement for a wheeled vehicle comprising an engine, continuously variable gearing between the engine and a drive shaft of the vehicle, power-command means operable by a vehicle driver to demand a variation in engine power, and electronic control means for varying the torque transmitted by the continuously variable gearing, said control means being responsive to the engine speed $w_e$, the drive shaft speed $w_d$ and the extent of actuation $R_a$ of the power-command means such that the torque transmitted to the drive shaft is a different function of engine speed $w_e$ for different values of $R_a$, said different functions corresponding to different power load-lines on an engine-power engine-speed graph, said control means permitting transition between said different load-lines to be effected without reducing the transmitted power for increased actuation $R_a$ of the power-command means and without increasing the transmitted power for reduced actuation $R_a$ of the power-command means.

According to another aspect of the present invention there is provided a power arrangement for the propulsion of a wheeled vehicle, comprising an engine, transmission means for coupling the engine to a drive shaft of the vehicle, said transmission means including continuously variable gearing, power-command means operable by a vehicle driver for demanding a variation in engine power, sensor means for providing signals indicative of the engine speed $w_e$, the drive shaft speed $w_d$ and the extent of actuation $R_a$ of the power-command means, actuator means for regulating the torque transmitted by the gearing, and electronic control means for receiving from said sensor means inputs indicative of $w_e$, $w_d$ and $R_a$ and for providing in response thereto outputs to said actuator means to determine the torque transmitted to the drive shaft in accordance with the power produced by the engine as a function of its speed and one of a series of power load-lines for the engine, which load-lines are related to the extent of actuation $R_a$ of the power-command means such that for increasing values of $R_a$ the particular load-line selected occurs at higher engine speeds $w_e$, said control means permitting transition between different load-lines to be effected without reducing the transmitted power for increased actuation $R_a$ of the power-command means and without increasing the transmitted power for reduced actuation $R_a$ of the power-command means.

In such arrangements in accordance with the present invention the torque and power transmitted to the drive shaft by the continuously variable gearing are determined in accordance with different load-lines for increasing actuation of the power-command means which may permit even a poor condition engine to be brought close to, for example, an engine target speed and to give acceptable power having regard to its condition. Thus, by maximum actuation of the power-command means the driver may be able to obtain nearly the maximum power that the poorer engine can provide. Preferably the load-lines are a steeply rising function of engine speed (at least for high values of $R_a$ and $w_d$) so that the engine can be brought to high torque values; this can permit the engine when in good condition to follow fairly closely a target operating line for low fuel consumption. The sensor and actuator means for arrangements in accordance with the invention can be few in number and simple. The complexity of signal processing required for the electronic control means can be realised in a comparatively cheap and reliable manner with integrated circuits, such as a microprocessor, formed by large scale integration (LSI) techniques.

In arrangements in accordance with the present invention, the regulation of the engine torque may also be effected by the electronic control system rather than directly by the driver's actuation of the power-command means. As will be described in more detail hereinafter, several advantages can result from this feature, particularly at low road speeds and for engine braking. Thus, for example, the system may be used to regulate the CVG so as to provide engine braking determined by the driver's operation of the power-command means and a gearing-select means, but without increasing the engine torque (making it less negative) by consuming extra fuel.

The electronic control system may be used to store previous values of engine speed and actuation of the power-command means and to compare these previous values with the next measured values so as to decide whether the driver is demanding an increase or reduction in power and to what extent the engine is accelerating or being retarded. Thus, the arrangement can be controlled such that, during a transient resulting from actuation of the power-command means to demand increased acceleration, the torque transmitted to the drive shaft by the CVG increases unless the engine acceleration is less than a predetermined value.

As will be described hereinafter, the arrangement can be operated in a simple and advantageous manner by using the control system to regulate the gear ratio of the CVG so as to reduce differences between the actual engine speed as measured by the sensor and a target engine speed which is determined in accordance with the power command of the driver, a target operating line for the engine for low fuel consumption, and the gear ratio limits of the CVG.

According to a further aspect of the present invention there is provided an electronic control system for a power arrangement in accordance with the invention, said control system comprising inputs for signals indicative of the engine speed $w_e$, the drive shaft speed $w_d$ and the extent of actuation $R_a$ of the power-command member, data processing means for deriving in response to said input signals output signals for regulating the torque transmitted by the continuously variable gearing, and output means for said output signals, said data processing means using a different function of engine speed for different values of $R_a$ to calculate a value for said transmitted torque, said different functions corresponding to different engine load-lines on an engine-power engine-speed graph, said control system permitting transition between said different load-lines to be effected without reducing the transmitted power for increased actuation $R_a$ of the power-command means and without increasing the transmitted power for reduced actuation $R_a$ of the power-command means.

In order that the invention may be more fully understood, and in considering further features thereof, reference will now be made, by way of example, to the accompanying drawings, of which:

Figure 1:
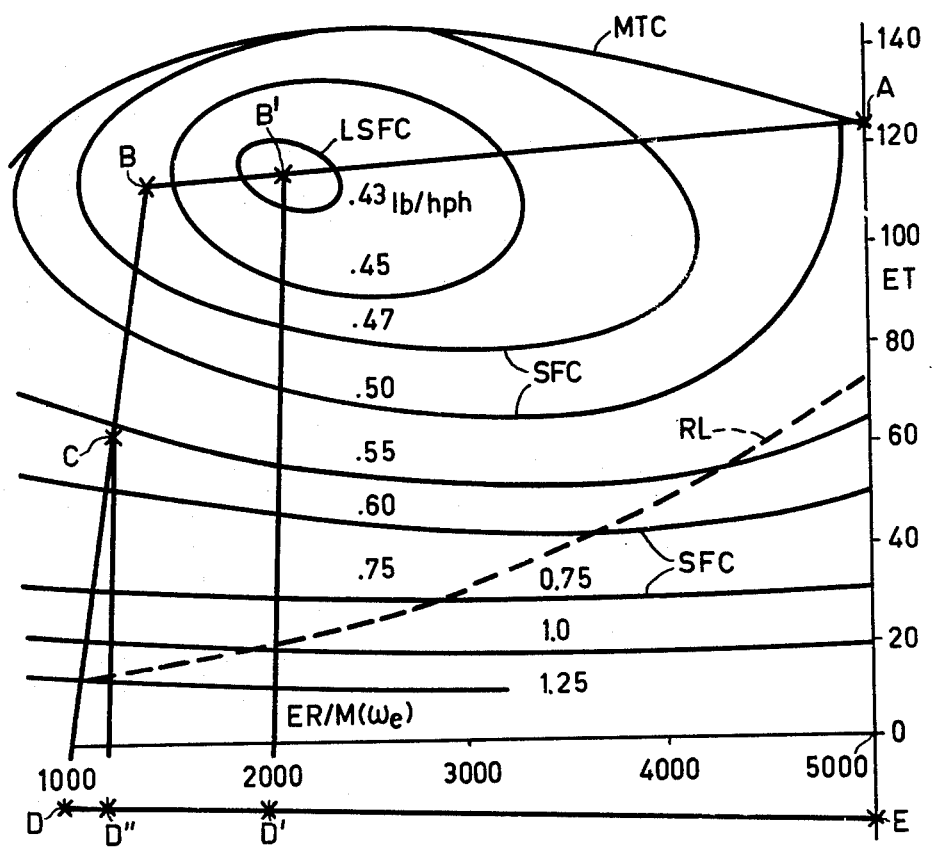
FIG. 1 is an engine efficiency map.

A typical example of an engine efficiency map for a road vehicle is shown in FIG. 1. This map is in the form of a graph which represents the torque/speed characteristic of a 2-liter petrol engine for a typical family sedan. The axes used for this graph are engine revolutions per minute (ER/M) and engine torque (ET) which is expressed in terms of brake mean effective pressure (bmep) measured in pounds per square inch (lb. per in.$^2$). The line MTC represents the maximum torque at full throttle. The lines SFC, which are superimposed on the graph, represent different values of specific fuel consumption measured in pounds per horsepower per hour (lb. per h.p.h.). Descending contour lines SFC converge towards a region of lowest specific fuel consumption LSFC which for the particular engine illustrated in FIG. 1 occurs for engine speeds around 2,000 revolutions per minute. Within the region of lowest specific fuel consumption there may be however (at least for some engines) more than one actual point where the specific fuel consumption is at a minimum value.

The broken line RL (road load) which is added to the graph represents the torque requirement to propel the vehicle at steady speeds on a level road using a power arrangement which is not in accordance with the present invention and has a conventional manual gear box giving a top gear corresponding to 20 m.p.h. per 1,000 m.p.h. at 90% transmission efficiency. It can be seen from the graph that at a steady cruising speed of, say 40 m.p.h., (i.e. an engine speed of 2,000 r.p.m.) the specific fuel consumption is in the region of 1 lb. per h.p.h. because the torque (20 lb. per in.$^2$ bmep) demanded from the engine is very low compared with the maximum torque which it could provide at that speed.

Thus, in general, it can be seen from FIG. 1 that for a given power output (i.e. the product of engine speed and torque) very low specific fuel consumption is given by a high (but not maximum) value of torque. This means that, to achieve very low specific fuel consumption, the engine should be run at almost the lowest speed at which it is capable of delivering the required power. The use of continuously variable gearing CVG instead of a conventional gear-box permits the adoption of such a strategy. There are, however, two lower limits. Firstly, engine vibration becomes objectionable below a certain speed and, secondly, the CVG has a limited range of gear ratios so that at high road speeds the lower engine speeds are not available.

The result of quantifying these factors is also shown in FIG. 1. The straight line AB gives approximately an optimum combination of torque and speed for any value of power from the maximum power $P_{em}$ at A to about 0.27 $P_{em}$ at B. This line AB represents an engine target operating line for very low fuel consumption. Part of the line AB also joins the region of lowest specific fuel consumption LSFC to the region of maximum engine power $P_{em}$ which occurs at point A. At the point B the use of optimum torque is only just acceptable owing to the increase in engine vibration with decreasing engine speed. In selecting the engine speed for point B, allowance should be made for the engine being in less than perfect condition, perhaps aggravated by it being cold.

The line BD represents a reduction in torque as the power is reduced and necessarily involves an increase in specific fuel consumption. This degradation is reduced to some extent by allowing the engine speed to fall gradually with decreasing torque; decreasing amplitude of the power impulses in the engine makes this acceptable. At the point D the engine throttle is fully closed and, if a significant amount of engine braking is required, the line DE can be followed. The corresponding engine braking power rises to a maximum at E.

As the power command (which would be given primarily by the position of the vehicle's accelerator pedal) varies, the control strategy would ideally follow the line ABDE. However, at high road speeds the gear ratio limit of the CVG (which may be, for example, 40 m.p.h. per 1,000 r.p.m.) would prevent part of this line being used, so that, for example at 50 m.p.h. and 80 m.p.h. the optimum lines would be ABCD"E and AB'D'E, respectively. Although the proposed control strategy has been shown in terms of straight lines, it should be understood that the use of curved lines is also possible and is within the scope of the invention as defined in the appended claims. In particular, the two straight lines AB and BD may be at least partly replaced by a single curved line ABD if so desired. Such a continuous curved line ABD can approximate to the optimum line for very low fuel consumption at high engine speeds while at lower engine speeds representing a worse line which can nonetheless allow the engine speed to fall gradually with decreasing torque.

Referring now to the other drawings a power arrangement in accordance with the present invention will be described, having a control strategy which can cause the operating point of an engine in good condition to follow these lines fairly closely, while giving acceptable results with an engine in poor condition. For low cost and good reliability the arrangement has sensors and actuators which are simple and few in number. However the information from these transducers is processed in an elaborate manner to reduce the effect of large variations in the condition of the mechanical system and also to improve the responsiveness and driveability of the vehicle. The use of large scale integration techniques for the electronic control system permits the complexity of the signal processing to be carried out comparatively cheaply and reliably.

Figure 2:
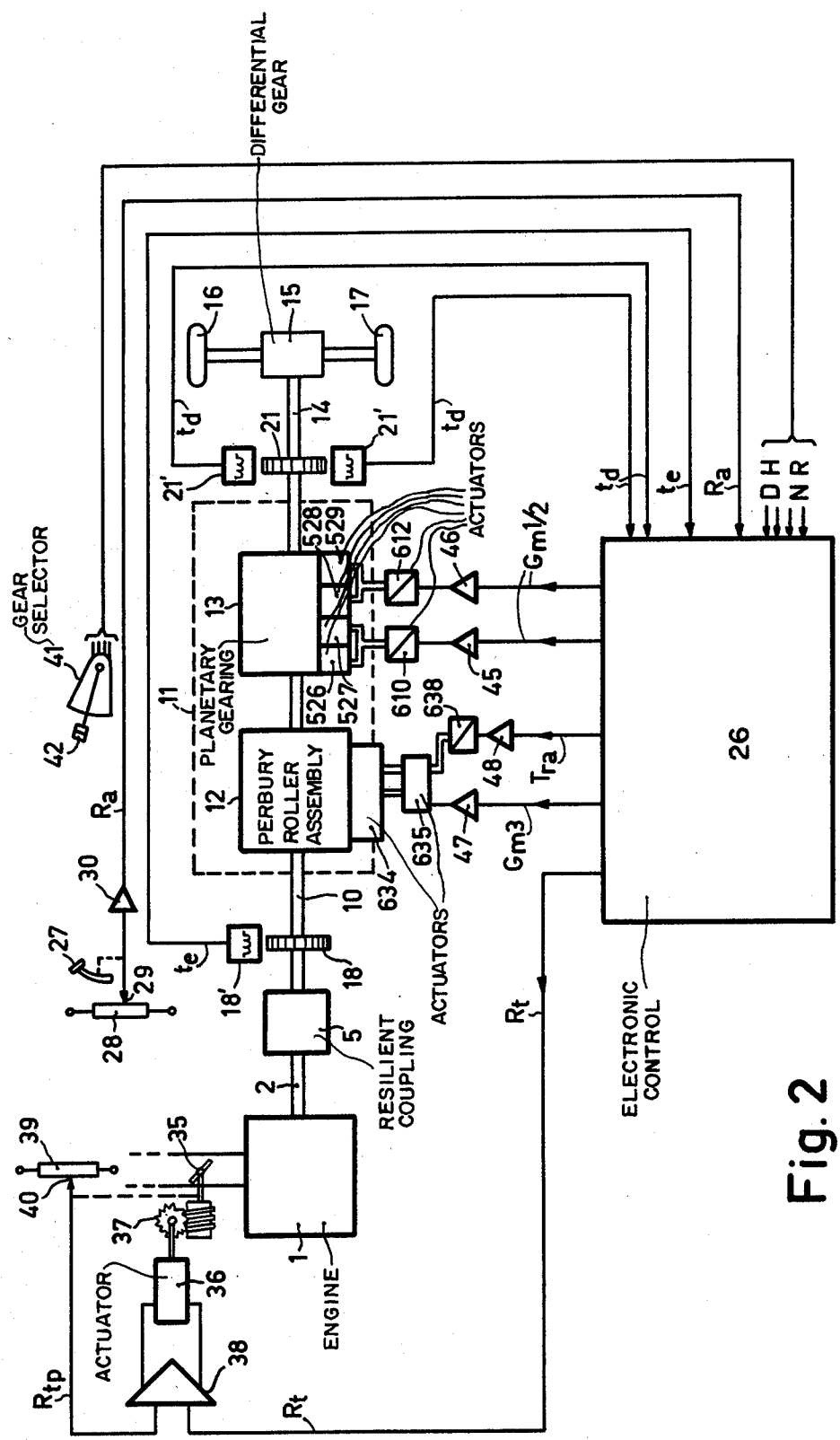
FIG. 2 shows diagrammatically a power arrangement in accordance with the invention.

The road vehicle propulsion arrangement shown diagrammatically in FIG. 2 comprises, as its source of power, an engine 1 which may be an internal combustion engine of the conventional spark-ignition gasoline-fuelled type. This engine 1 is coupled to a drive shaft 14 of the vehicle by transmission means comprising the engine output (crank) shaft 2, continuously variable gearing 11 and a resilient coupling 5 between the engine output shaft 2 and the input shaft 10 of the CVG 11. The vehicle drive shaft 14 is connected between the output side of the CVG 11 and a differential gear 15 of the vehicle for which the power transmission arrangement is provided. Road wheels 16 and 17 are connected in conventional manner to the differential gear 15.

A power-command means such as an accelerator pedal 27 is provided and is operable by a vehicle driver for demanding a variation in engine power.

Sensor means (18, 18'), (21, 21') and (28, 29) are associated with the transmission means 2, 5, 11, 14 and the accelerator pedal 27 for providing electrical signals $t_e$, $t_d$ and $R_a$ respectively which are indicative of the engine speed $w_e$, the drive shaft speed $w_d$ and the extent of actuation $R_a$ of the power-command means 27. Actuator means 634, 635, 638, 526 to 529, 610 and 612 are associated with the CVG 11 for regulating the torque $T_d$ transmitted by the CVG 11. Actuator means 35, 36 are also associated with the engine 1 in the arrangement of FIG. 2 for regulating the torque $T_e$ produced by the engine 1.

Figure 3:
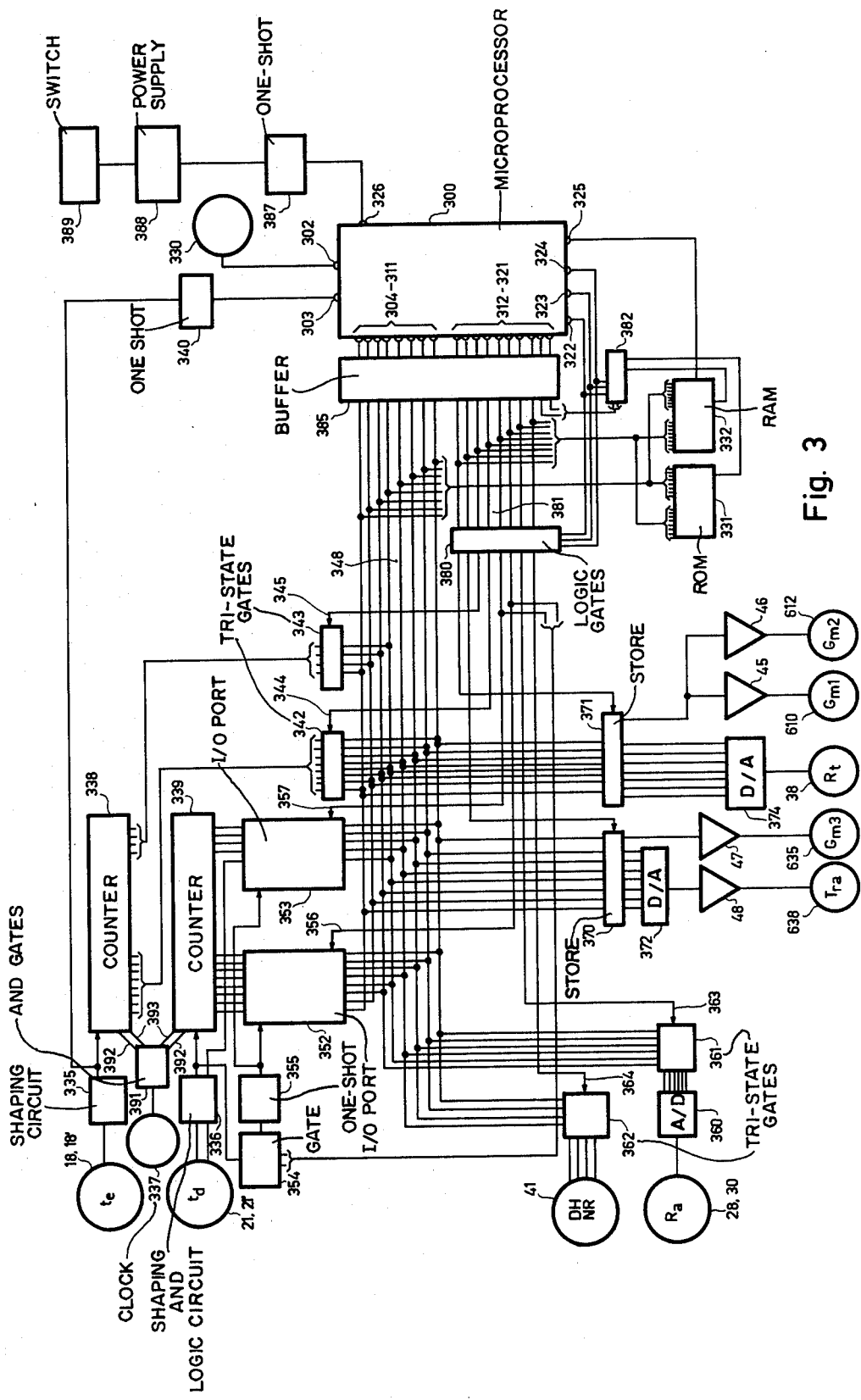
FIG. 3 shows diagrammatically in greater detail an electronic control system in accordance with the present invention and suitable for use in the arrangement of FIG. 2.

The arrangement of FIG. 2 further comprises an electronic control system 26 for receiving from said sensor means inputs indicative of $w_e$, $w_d$ and $R_a$ and for providing in response thereto outputs to said actuator means. The system 26 also receives an input from a gearing-selection switch 41 the lever 42 of which is also operated by the vehicle driver. The system 26 provides an output $R_t$ to regulate the torque $T_e$ produced by the engine 1, and outputs $T_{ra}$, Gm1, Gm2 and Gm3 to regulate the torque transmitted by the CVG 11. FIG. 3 shows an example of a suitable electronic control system 26. The manner in which it is used to implement the desired control strategy will be described later.

The continuously variable gear 11 may be of the Perbury type, and may comprising a rolling assembly 12 and an epicyclic gear 13, as indicated in outline in FIG. 2. However, it should be understood that other types of CVG may be used, for example a DAF Variomatic transmission gear-box, as well as gearing with hydrostatic coupling rather than mechanical traction type coupling, and these are within the scope of the present invention as defined in the appended claims.

Figure 5:
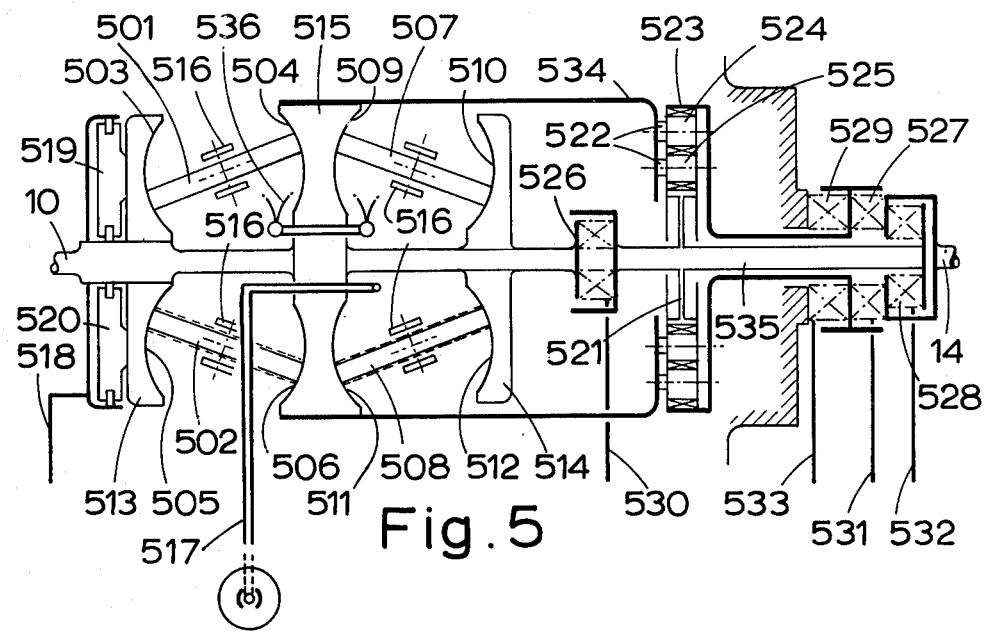
FIGS. 5, 5a, 5b and 5c show diagrammatically mechanical details of a continuously variable gear suitable for use in the arrangement of FIG. 2.

The continuously variable gear 11 may have the form shown in FIG. 5, to which reference is now made. The rolling assembly 12 of the CVG 11 comprises a first set of three rollers 501, 502 and 502' for transmitting a traction rolling drive between toroidal surfaces 503, 505 and 504, 506, and a second set of three rollers 507, 508 and 508' for transmitting a traction rolling drive between toroidal surfaces 509, 511 and 510, 512. The toroidal surface 503, 505 is formed on a first input drive disc 513 which is splined on the input shaft 10 of the rolling assembly 12 (FIG. 2). Similarly, the toroidal surface 510, 512 is formed on a second input drive disc 514 which is also secured to the input shaft 10. The other toroidal surfaces 504, 506 and 509, 511 are formed on an output drive disc 515 which is rotatable relative to the shaft 10. The sets of rollers are held in compression between the discs and torque is transmitted between rollers and discs by shearing an oil film that lies between them. The positions of the points of contact of each roller with the co-operating toroidal surfaces determine the gear ratio of the rolling assembly. Depending on the angle of the rollers the gear ratio can be a reduction or an increase ratio. The rollers are "steered" to the required angle by a small movement of the axes of their carriers, represented at 516, which also sustain the torque reaction on them. This movement is made, and the torque reaction held, by fluid pressure. It is not thought necessary for the purposes of the present invention to show or describe in detail the carriers represented at 516, but briefly, each carrier is connected by a swivel coupling to a limb of a rocker lever 536 which is pivotable about a pin carried by a leg of a common fixed spider. Inwardly extending limbs of the rocker levers 536 are received in guide members in a common torque equalizing control sleeve which is shiftable rotationally by fluid pressure to control the angle of the rollers. This type of continuously variable gear, known as the Perbury gear, is described in "Perbury Continuously Variable Ratio Transmission", Advances in Automobile Engineering (Part II), July 1963, pages 123 to 139, and in United Kingdom Patent Specification No. 1,078,791, the contents of which are hereby incorporated into the present Specification.

A member 517 represents a torque arm connected to the control sleeve. This torque arm, which transmits a reaction torque proportional to the sum of the input and output torques of the rolling assembly, is shiftable by fluid pressure to vary the angle of the roller carriers to steer the rollers to provide different input/output ratios of the rolling assembly. This fluid pressure, being proportional to the torque, is also used to end-load the rolling assembly. A fluid pressure connection 518 introduces this fluid pressure behind an annular end thrust cylinder 519, 520.

The overall ratio change of the rolling assembly 12 is about 5:1. In order to extend the total effective ratio range of the CVG 11 so that continuous change is possible from a very high gearing (for example 40 m.p.h. per 1,000 r.p.m.) down to zero forward speed (and also into reverse) the epicyclic gear 13 is provided. This combination also has the advantage that the direction of rotation of the vehicle drive shaft 14 (FIG. 2) can be made to correspond with that of the shaft 10 without further gearing. These two shafts would have reverse directions of rotation using only the rolling assembly.

Figure 5A:
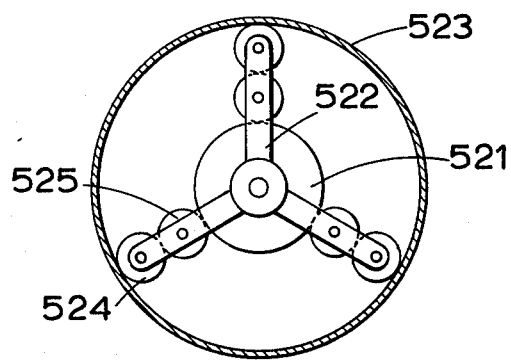

The epicyclic gear 13 of the CVG 11 comprises a sun gear 521, a planet carrier 522 and a gear ring 523. The planet carrier 522 carries pairs of planet gears 524, 525 which give, inter alia, a non-reversing drive through the epicyclic gear 13. This arrangement of the epicyclic gear 13 is also shown in FIG. 5a. There are provided in conjunction with the epicyclic gear 13 three clutches 526, 527 and 528 and a brake clutch 529 all of which are fluid pressure operated for engagement. Fluid pressure connections 530 to 533 introduce fluid pressure to these clutches, respectively.

The rolling assembly output drive member 515 is permanently connected to the planet carrier 522 by a member 534. The input shaft 10, carrying the input drive members 513 and 514, can be coupled to a shaft 535, to which the sun gear 521 is secured, by the clutch 526. The clutch 528 can couple the sun gear shaft 535 to the output shaft 14 of the CVG, and the clutch 527 can couple the ring gear 523 to this output shaft 14. The brake clutch 529 can brake the ring gear 523. The epicyclic gear 13 has an overall gear reduction of about +2 with the planet carrier 522 fixed. This arrangement of the epicyclic gear and clutches is shown more clearly in diagrammatic form in FIGS. 5b and 5c to which reference will now be made.

Figure 5B:
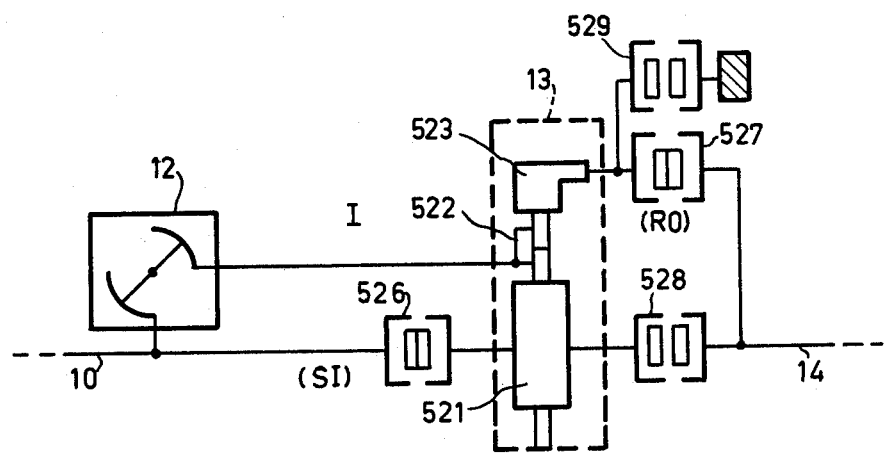
Figure 5C:
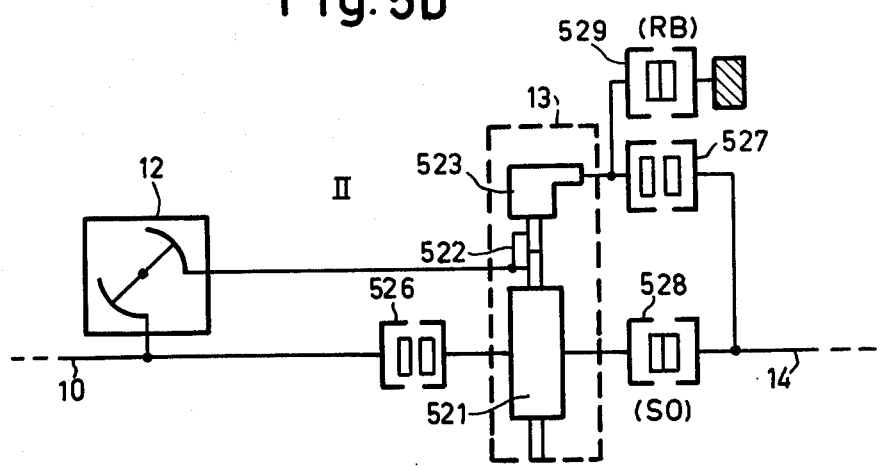

Two different modes I and II of operation of the CVG are shown in FIGS. 5b and 5c, respectively. In the mode I shown in FIG. 5b, the clutches 526 and 527 are engaged so that the input shaft 10 is connected to the sun gear 521 (SI) and the output shaft 14 is connected to the ring gear 523 (RO). The clutches 528 and 529 are disengaged. In this mode there is a recirculation of power through the rolling assembly and the overall efficiency is low over a fairly wide band around zero output speed. With an epicyclic ratio of +2 and within a range of 0.33 to 1.5 gear ratio across the rolling assembly 12, the overall gear ratio of the CVG 11 in this mode I will change from a 0.33 forward ratio at the rolling assembly gear ratio of 0.33, through zero at unity ratio in the rolling assembly, to a maximum reverse ratio of 0.25 at the rolling assembly gear ratio of 1.5. This mode I is therefore suitable for starting and reversing.

The range of overall forward gear ratios is extended in the mode II, shown in FIG. 5c, in which clutches 527 and 526 are disengaged and clutches 528 and 529 are engaged. The output shaft 14 is now connected to the sun gear 521 (SO) and the ring gear 523 is braked (RB). In this mode II, the epicyclic gear is functioning as a reverse gear of unity ratio, so that the power is transmitted directly through the rolling assembly. The overall gear ratio of the continuously variable gear will now change from a 0.33 forward ratio to a 1.5 forward ratio as the rolling assembly changes through the same ratio range. Thus, the 5:1 range of mode II covers the main working range of the vehicle (for example 40 m.p.h. per 1,000 r.p.m. to 8 m.p.h. per 1,000 r.p.m.), and the recirculating mode I only covers the lowest forward gear ratios and reverse. A synchronous gear change can be made by changing between modes I and II at a rolling assembly ratio of 0.33 when the two modes give the same overall gear ratio.

Figure 5D:
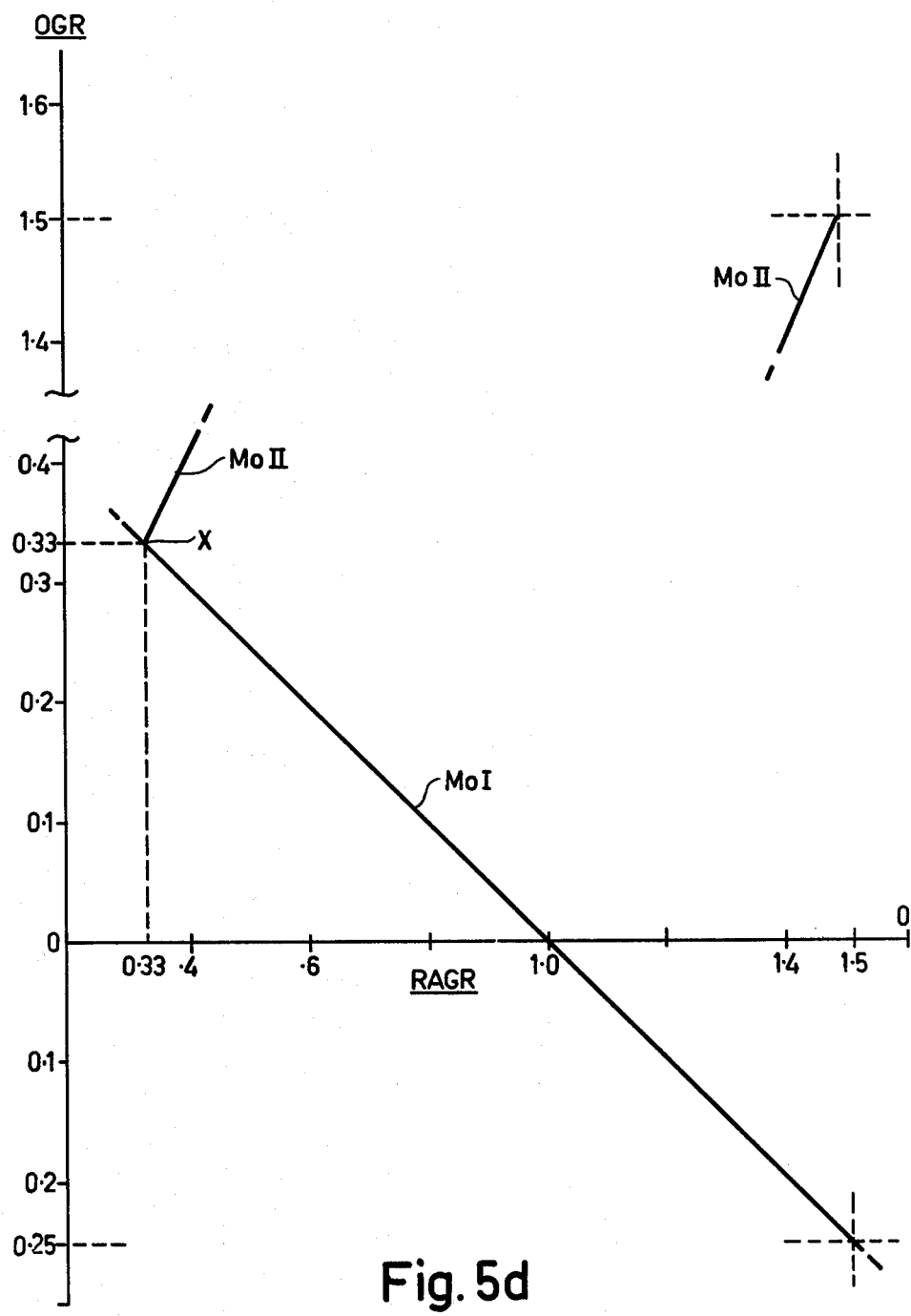
FIG. 5d is a graph showing gear ratios of this continuously variable gear.

FIG. 5d shows graphically, the relationship between the overall gear ratio OGR and the rolling assembly gear ratio RAGR. The straight line Mo I shows the relationship in mode I and the straight line Mo II shows the relationship in mode II. Overall gear ratios OGR below the 0 axis are reverse ratios and those above this axis are forward ratios. Point X is the change point between modes I and II at the rolling assembly ratio of 0.33.

Figure 6:
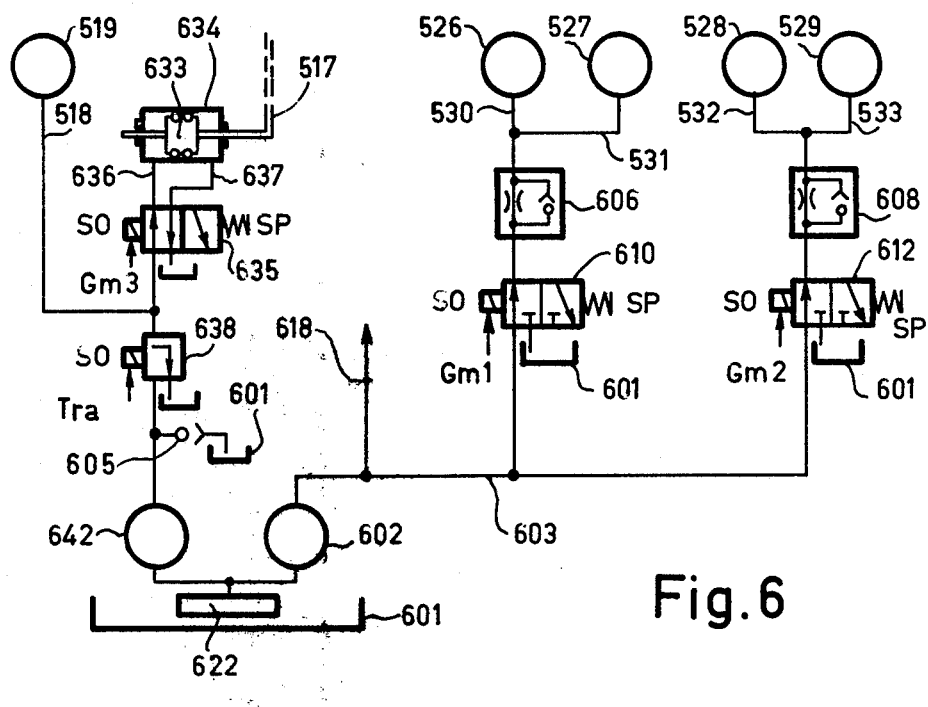
FIG. 6 shows diagrammatically a fluid pressure system for the continuously variable gear.

An electromagnetically controlled hydraulic pressure system for the CVG 11 in the arrangement of FIG. 2 is shown diagrammatically in FIG. 6. This system comprises a fluid reservoir or sump 601 from which traction fluid is fed through a filter 622 by separate pumps 602 and 642. The pumps 602 and 642 are suitably mechanically driven from the input shaft 10 of the CVG 11.

The fluid pressure developed by a variable stroke pump 602 is fed to fluid pressure line 603. The fluid pressure for the four epicyclic clutches 526 to 529 is fed directly from the pump output, thus ensuring that the epicyclic gear 13 reverts to neutral immediately input shaft rotation ceases. From line 603 fluid is also bled off along line 618 to the various parts of the CVG 11 that require lubrication, especially the traction surfaces of the rolling assembly 12.

The fluid pressure in the line 603 is used selectively by selective energisation of 3-port 2-way solenoid-operated valves 610 and 612 to control the four epicyclic clutches of the CVG 11. More specifically, the fluid connection 530 and 531 for the mode I clutches 526 and 527 are fed from the valve 610 via a one-way flow controller 606; the fluid connections 532 and 533 for the mode II clutches 528 and 529 are fed in a similar way from the valve 612 via a one-way flow controller 608. Each of these solenoid valves 610 and 612 is normally closed by the force of a spring $sp$, and is opened by energisation of its solenoid $so$. A digital control signal Gm1 which has a high (on) level and a low (off) level energises the valve 610 to engage the mode I clutches 526 and 527, and a similar digital control signal Gm2 energises the valve 622 to energise the mode II clutches 528 and 529. When Gm1 is high, Gm2 is low (and vice versa). The preset controllers 606 and 608 determine an acceptable rate for the clutch engagement. Disengagement is effected by switching the solenoid valve to block the inlet port and connect the actuator 610, 612 to the sump 601 which results in the fluid exhausting rapidly from the clutches through the non-return valve of the flow controllers 606, 608.

Control fluid for actuating the torque reaction arm 517 of the rolling arm 517 is connected via mechanical linkage to a torque reaction assembly 12 is supplied by the pump 642. The torque reaction/piston 633 which is slidable in a fluid pressure chamber 634 into which fluid pressure can be fed selectively to either side of the piston 633 from a cross-over solenoid valve 635 through respective fluid connections 636 and 637. A digital control signal Gm3 (which has a high value and a low value) energises the solenoid valve 635 to interchange the fluid pressure across the piston 633, the result of which is to reverse the sense of the torque produced by the torque reaction arm 517. The actual value of fluid pressure fed to the chamber 634 is determined by proportional energisation of a solenoid-operated pressure control valve 638 in accordance with the magnitude of an analogue control signal $T_{ra}$. Fluid passing through the variable orifice of this valve 638 is returned to the sump 601. The delivery of the pump 642 is sufficient to effect the required maximum controlled rate of displacement of the control piston 633 linked to the torque reaction arm 517. A non-return valve 605 allows additional fluid to flow into the control cylinder chamber 634 when the control piston 633 is moving at a very high rate, such as when the wheels are being over-braked by the conventional brakes. The unpressurized end of the chamber 634 is connected through valve 635 to the sump 601. The control pressure from valve 638 is also applied along line 518 to end load the annular end thrust cylinder 519, 520 (see FIG. 5) of the rolling assembly 12.

The steering angle of the rollers of the CVG 11 is determined by the position of the piston 633. Since the net torque on the total rolling assembly 12 must be zero (neglecting inertial effects within the assembly) the piston 633 receives a force from the mechanical system that balances the sum of the input and output torques on the discs 513, 514, 515 of FIG. 5. This torque reaction $T_{ra}$ can be related also to the torque on the drive shaft $T_d$, as follows:

$$T_{ra} = T_i + T_o$$

where $T_i$, $T_o$ are the torques exerted on the rollers by the input and output discs.

But (neglecting power losses) $T_i$ is related to $T_o$ by the rolling assembly speed ratio, and $T_o$ can be related to the drive shaft torque $T_d$ for each mode of the gear-box. This gives the following equation 1 for an epicyclic gearing with a basic ratio of 2:

$$T_{ra} = T_d(w_d/w_e + 1) \text{ for mode II}$$
$$T_{ra} = T_d(w_d/w_e - 1) \text{ for mode I} \quad (1)$$

where $w_e$, $w_d$ are the angular speeds of the input (i.e. engine) and drive shaft respectively. Since the transmitted power $P_d$ is $w_d T_d$, equation 1 can be used to relate the torque reaction to the power $P_d$ transmitted to the drive shaft 14.

At the mode I to mode II transition the speed ratio $w_d/w_e$ would normally be 0.33 so equation 1 shows that if the transmitted power $P_d$ remains constant through the transition the value of $T_{ra}$ changes from $-0.67T_d$ to $+1.33T_d$. Equation 1 also shows the gradual change in torque reaction for a given drive shaft torque as the speed ratio varies within each mode.

The electronic control system 26 defines the gearing ratio by providing via valve 638 a force which balances the torque reaction force on the piston 633. As indicated in FIG. 2, the digital control signals Gm1, Gm2 and Gm3 and the analogue control signal $T_{ra}$ provided by the control system 26 for regulating the CVG are applied to their respective valves 610, 612, 635 and 638 through amplifiers 45 to 48.

The control system 26 also provides an engine-throttle control signal $R_t$. The power and torque produced by the engine 1 is controlled through the engine throttle 35 which determines according to its position the amount of fuel-air mixture fed to the engine 1. As shown in FIG. 2, the throttle 35 has no direct linkage to the accelerator pedal 27 such as in a conventional motor vehicle. Instead, the position of the throttle 35 is determined by a servo motor 36 through gearing 37 in response to the output from a servo amplifier 38. A potentiometer 39 has its tapping point 40 linked to the throttle 35 so as to produce a voltage which varies as the position of throttle 35 varies. This voltage forms a control signal $R_{tp}$ which is indicative of the present throttle position. This control signal $R_{tp}$ is applied to one input of the servo amplifier 38 to maintain the throttle setting. Change in the throttle setting is effected by the analogue control signal $R_t$ applied to a second input of the servo amplifier 38 from the control system 26.

The control system 26 receives an input from the accelerator pedal 27 of the vehicle. A potentiometer 28 produces at its tapping point 29 which is linked to pedal 27 a voltage that varies as the accelerator pedal 27 is actuated. This voltage, possibly after amplification by an amplifier 30, forms an analogue control signal $R_a$ which is indicative of the extent of actuation of the accelerator pedal 27.

Signals $t_e$ and $t_d$ indicative of the engine speed $w_e$ and the drive shaft speed $w_d$ respectively are also input into the control system 26. The signals $t_e$ and $t_d$ represent the magnitude of the revolution period of the engine 1 and drive shaft 14 and can be produced in known manner by transducers 18' and 21' (which may be for example electro-magnetic pick-ups) associated with toothed discs 18 and 21 which are mounted on the shafts 10 and 14 respectively. Such signals $t_e$ and $t_d$ may have a high value during the passage of a tooth past the transducer and a low value for the interval between teeth. Two transducers 21' are used on the same toothed disc 21 for the drive shaft speed. These two transducers 21' are arranged at different angular positions around the disc 21 so that their square-wave outputs $t_d$ are shifted in phase. As will be described later, the control system 26 derives the sense of rotation of the drive shaft 14 from these two signals $t_d$. If desired, the disc 18 may be mounted on the shaft 2, although a smoother engine-speed signal is obtained by mounting it on the shaft 10 as shown in FIG. 2.

The gearing-selector switch 41 can provide any one of four position signals D, H, N, R according to the position of its manually-operated selector arm 42. The signals may be in the form of a four-bit digital number, one bit being positive for each of the positions, D, H, N, R. The position D is used for normal forward driving, the position N is neutral, the position R is reverse, and the position H is selected to demand increased engine braking when the accelerator pedal 27 is largely released (low values of $R_a$). Of course, if desired, further gearing select positions may be provided, for example a further H position to demand a further increase in engine braking. The H position acts through the control system 26 to maintain a substantial negative torque on the drive shaft 14 for low values of actuation $R_a$ of the accelerator pedal 27 and for moderate and high values of $w_d$. Mode I operation of the CVG 11 is used when the neutral and reverse positions N and R are selected. The CVG mode is determined by the control system 26, as will be described later.

The electronic control system 26 operates to define the pressure on the CVG control piston 633 so that the engine speed $w_e$ is servoed onto the appropriate operating point. The strategy takes account of both variations in engine performance (which may be quite drastic under fault conditions) and the transients that occur when the target engine speed varies. The way a target engine speed $w_{et}$ is deduced from the position $R_a$ of the accelerator pedal 27 and the way an appropriate amount of engine braking can be provided will also be described.

The function of the control system 26 is to bring the engine 1 to an acceptable operating point under all conditions, taking account of the limited range of forward and reverse gearing of the CVG 11.

The arrangement of FIG. 2 is managed by varying both the engine torque $T_e$ (by means of the engine throttle 35) and the torque $T_d$ transmitted to the drive shaft 14 (by means of the pressure on the CVG control piston 633). A steady state is reached when the power $P_e$ produced by the engine 1 equals the power $P_d$ transmitted to the drive shaft 14. Any difference between the power produced $P_e$ and that transmitted $P_d$ is the power $P_{ef}$ flowing into the engine inertia (including the inertia of components attached to the shafts 2 and 10 in FIG. 2) causing it to accelerate. Thus the throttle and the Perbury control pressure must be operated together so that this power difference $P_{ef}$ is always positive when the engine speed is too low for the driver's current power requirements; the power difference must be negative when the engine speed is too high.

Reference will now be made to FIGS. 7 to 11 to illustrate various relationships between the parameters $P_e$, $T_e$, $w_e$, $P_c$, $P_d$, $T_c$, $T_d$, $w_d$, $R_t$ and $R_a$, and how a suitable control strategy can be determined for the arrangement of FIG. 2 using these parameters.

Figure 7:
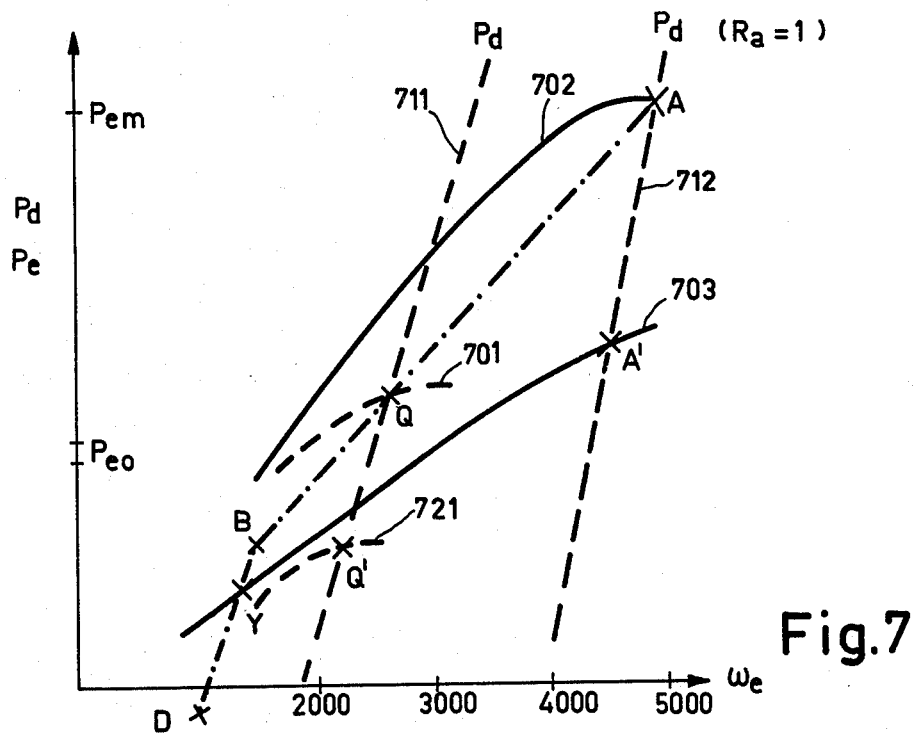

FIG. 7 is a graph illustrating in an arrangement in accordance with the present invention a suitable relationship between the power $P_e$ produced by the engine 1 and the power $P_d$ transmitted to the drive shaft 14 both as a function of engine speed $w_e$. As stated hereinbefore, in a steady state situation, the power $P_e$ produced by the engine 1 equals the power $P_d$ transmitted to the drive shaft 14 so that both these parameters can be usefully represented by the ordinate of the graph of FIG. 7.

The two solid lines 702 and 703 indicate the maximum power produced by the engine (i.e. at full throttle) as a function of its speed $w_e$. The upper line 702 is for a normal engine and the lower line 703 is for a worst case (e.g. a cold engine with an inoperative sparking plug). The target operating line for a normal engine and low road speeds, taken from FIG. 1, is shown by the line ABD. This line ABD generally lies above the line 703 for maximum engine power in the worst case, as indicated in FIG. 7. Thus a strategy which is not in accordance with the present invention and is based on a fixed relationship (such as a line ABD) between transmitted power $P_d$ and engine speed $w_e$ cannot ever follow the desired line AB for low fuel consumption, because for the worst case engine the maximum power obtainable at full throttle would be only that at Y which would be unacceptably low.

However, in accordance with the present invention the control strategy adopted for the power arrangement of FIG. 2 permits the engine 1 if in poor condition to give acceptable power having regard to its condition and if in good condition to follow fairly closely the target operating line AB for low fuel consumption.

In accordance with the present invention the transmitted power $P_d$ is determined in accordance with a different function of $w_e$ for different values of $R_a$. These different functions are represented in FIG. 7 by a given power load-line (such as the line 711) for a given constant extent of actuation $R_a$ of the accelerator pedal 27. Line 711 is one of a series of such power load-lines for the engine which are related to $R_a$ such that the measured value of $R_a$ determines the particular one selected and the power load-lines occur at higher engine speeds $w_e$ for increasing values of $R_a$. (As will be described hereinafter, at low road speeds the particular line selected is also related to $w_d$, and the load-lines occur at lower engine speeds as $w_d$ decreases). Thus, for example the power load-line 712 is the line related to maximum actuation ($R_a = 1$) of the accelerator pedal 27 (and moderate or high values of $w_d$) and intersects the full throttle power curve 702 for the normal engine condition at point A corresponding to the maximum power $P_{em}$.

At the operating point in the steady state condition the power transmitted $P_d$ equals the power $P_e$ produced by the engine. A necessary condition for a stable operating point is that the transmitted power $P_d$ increases with engine speed $w_e$ more rapidly than the power produced $P_e$. This is shown in FIG. 7 by the $P_d$ and $P_e$ lines 712 and 702 respectively at the operating point A for maximum actuation of the accelerator pedal 27, and by the $P_d$ and $P_e$ lines 711 and 701 at the operating point Q for a given lesser actuation of the pedal 27. The line 701 represents the power produced by the engine (in normal condition) for the value of $R_t$ corresponding to the same value of $R_a$ as power load-line 711. The intersection of these two lines 701 and 711 (at Q) is therefore the stable operating point for this accelerator position $R_a$. By defining $P_d$ and $R_t$ as a suitable function of $R_a$, as described later, all such operating points for normal engine conditions can be arranged to lie on or near the line ABD at low road speeds and on modified lines (such as ABCD" and AB'D') at higher road speeds in accordance with FIG. 1.

At least for the higher values of $R_a$ and $w_d$ (which values are at least as high as half the maximum values), the power load-lines are also preferably steeper than that part (AB) of the line ABD where the engine is operating at very low specific fuel consumption, and may even be steeper than the part BD. As described earlier with reference to FIG. 1, part of the line AB is also the straight line which joins the region of maximum engine power $P_{em}$ to the region of lowest specific fuel consumption LSFC at which the engine power is $P_{eo}$.

The higher values of $R_a$ and $w_d$ occur for example when the vehicle is travelling on a level road with a constant extent of actuation $R_a$ of the accelerator 27 (i.e. in a steady operating regime) when the power transmitted $P_d$ is at least as high as the power $P_{eo}$ of the engine in its region of lowest specific fuel consumption. The power load-line 712 for maximum actuation $R_a$ of the accelerator 27 at the higher values of $w_d$ may increase more than twice as rapidly with engine speed $w_e$ than does the line AB, and in the example shown in FIG. 7 its slope is more than five times as steep as the line AB.

This control strategy in which the transmitted power $P_d$ as a function of engine speed $w_e$ follows a given line (e.g. line 711) for a given actuation $R_a$ of the accelerator 27 results in a servoing action which permits acceptable power to be obtained from engine 1 even when in poorer condition. Curve 721 shows the engine power $P_e$ curve for the poor condition engine with the same extent of actuation $R_a$ of the accelerator 27. This gives a stable operating point Q' with the $P_d$ curve 711. If the driver requires more power he can increase $R_a$ up to $R_a = 1$ which would give the operating point A'; this is a considerable improvement over the point Y. By making the power transmitted $P_d$ a steeply varying function of engine speed corresponding to different load-lines for different values of $R_a$, as indicated in FIG. 7, the engine is brought close to its target speed largely irrespective of its condition, and the power at A' is nearly the maximum the poor condition engine can provide, which is what the driver wants.

Figure 8:
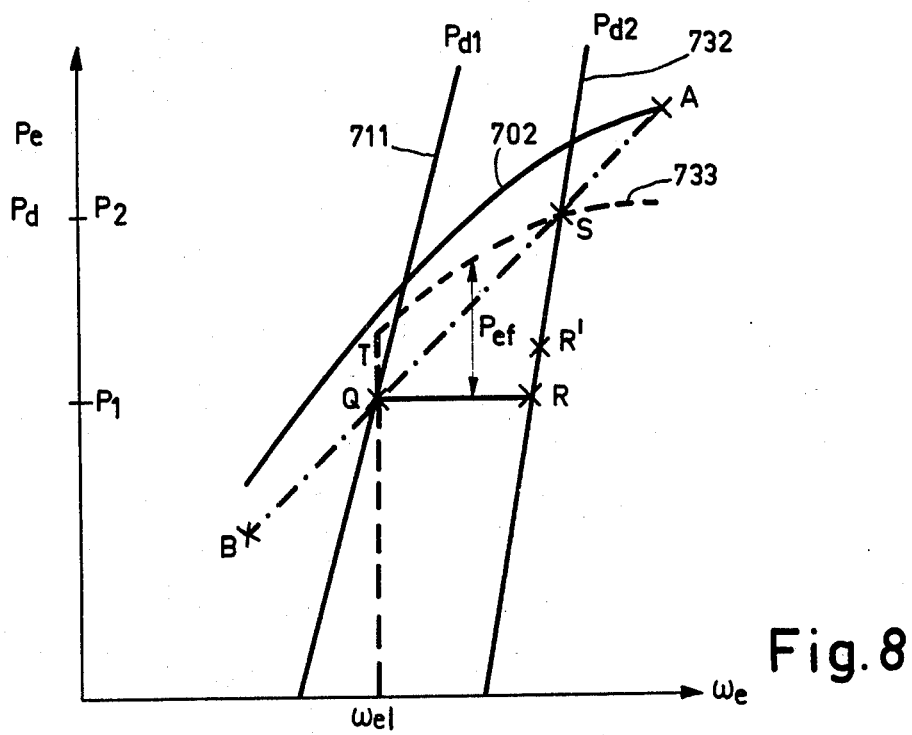

FIG. 8 is a graph having the same ordinate ($P_e$ and $P_d$) and the same abscissa ($w_e$) as FIG. 7 and includes the lines 702, 711 and AB and operating point Q of FIG. 7. FIG. 8 will be used to evaluate the behaviour of the system during any transient resulting from a change in actuation $R_a$ of the accelerator 27, for example when the operating point changes from Q to S as shown in FIG. 8 which is an increase in power from $P_1$ to $P_2$. Suppose that at Q the driver suddenly depresses the accelerator 27 such that the power produced by the engine follows the $P_e$ line 733 that passes through S. If the value of $P_d$ simultaneously changed to correspond to the $P_d$ line 732 ($P_{d2}$) passing through S, this would imply a reduction in transmitted power at the initial engine speed $w_{e1}$; the driver would find this unpleasant since he is expecting more power. So this reduction in transmitted power has to be avoided. One way of doing this might be based on limiting the rate at which $P_d$ changes in response to a change in $R_a$, in other words introducing a time constant so that the control system operates on a slower variation of $R_a$ than the actual. But such a delay would only give a satisfactory approximation to the required behaviour over a limited range of conditions, and a better approach would be to control the transient directly. One way of doing this, which is in effect a limiting case, is to maintain the transmitted power constant at its value at the start of the transient ($P_1$) until this is less than the new value of $P_d$. The transmitted power then follows the line QRS in FIG. 8. The difference between $P_e$ line 733 and this line QRS is the power $P_{ef}$ going into the engine flywheel. By maintaining the transmitted power constant between Q and R the value of $R_{ef}$ is quite large so the engine is accelerated quickly. However a better compromise might be to provide a small (linear) increase in transmitted power between Q and R', for example, at the expense of an increased delay in reaching the steady state value on line 732. In any case the power transmitted must always be well below the engine power line 733 (TS) otherwise the delay in reaching the steady state point S would be unacceptable. How this can be achieved will be described hereinafter.

Whatever compromise is adopted the large increase in engine speed needed for a large increase in power means that the responsiveness of the vehicle is determined by the inertia of the engine flywheel which should be as small as possible consistent with adequately smooth running at low engine speeds.

If the driver commands less power, by partially releasing the accelerator pedal 27, it is natural to adopt a similar strategy. It would be unpleasant if not dangerous, for the transmitted power to increase during the transient and the limiting case would again be to maintain the transmitted power constant initially. In this case, where $R_a$ has been decreased, the condition that the new value of $P_d$ should be used is that it is smaller than the original value. The logic for performing these two functions, depending on whether $R_a$ is increasing or decreasing, is readily performed using digital techniques. The logic can be arranged to prevent the engine being stalled (even if it misfires) by reducing the transmitted power if the engine is well below its target speed $w_{et}$ and is not accelerating rapidly.

Some equations which can provide the basis of the control logic will now be derived in accordance with FIGS. 7 to 11.

Figure 10:
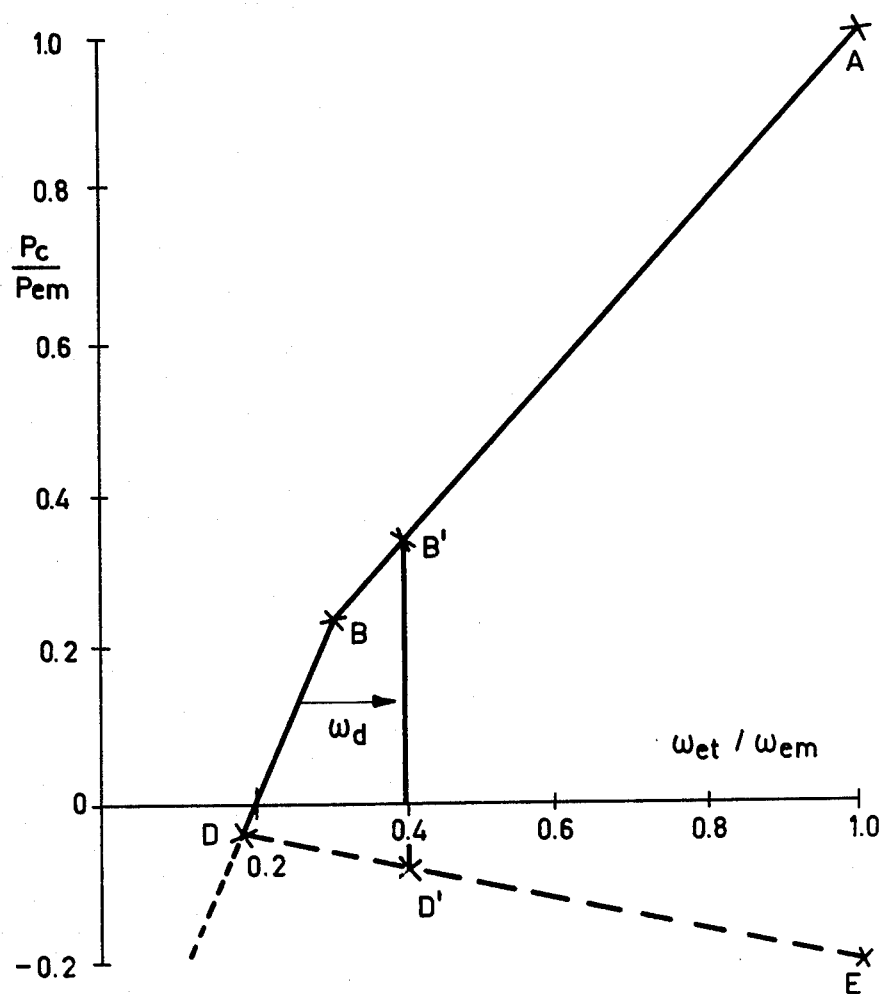

The way the power transmitted can be defined so that the engine is servoed onto an appropriate target engine speed $w_{et}$ is illustrated in FIGS. 7 and 10. FIG. 7 has been previously considered. FIG. 10 is a graph derived from FIG. 1 and shows the target line ABDE as a function of power demanded $P_c$ by a given actuation of the accelerator 27 and the target engine speed $w_{et}$ for operation on the target line. The power and engine speed are normalised to maximum values of 1 by dividing by the maximum engine power $P_{em}$ (at A), and the engine speed $w_{em}$ at this maximum engine power. For high values of $w_d$, lines such as the line B'D' are followed instead of BD. From FIG. 10, it can be seen that any point on the line ABD may be represented by particular values of $P_c$ and $w_{et}$. By writing the points of intersection of the transmitted power $P_d$ load-lines with the line ABD in FIG. 7 in terms of $P_c$, $w_{et}$, the power transmitted $P_d$ in the steady state can be represented by the following equation 2:

$$P_d = P_c + S.P_{em}(w_e - w_{et})/w_{em} \quad (2)$$

where $P_c$ and $w_{et}$ are functions of $R_a$ and $w_d$, and where S represents the slope of the power load-lines (e.g. lines 711, 712 etc.) of FIG. 7 and determines how steeply the transmitted power $P_d$ increases with engine speed $w_e$. The power load-lines shown in FIG. 7 are straight lines although it should be understood that curved load lines can be used and are within the scope of the invention as defined in the appended claims.

The target engine speed $w_{et}$ is derived as indicated in FIG. 10; approximations may be used so that $w_{et}$ might be defined as the largest of four values, for example:

$$w_{et} = (0.1 + 0.9P_c/P_{em})w_{em} \quad (3a)$$

$$\text{or } (0.2 + 0.4P_c/P_{em})w_{em} \quad (3b)$$

$$\text{or } 0.9\, m\, w_d \quad (3c)$$

or $-0.9 \, m' \, w_d$ (3d)

whichever is the largest,
where $m$, $m'$ are respectively the maximum forward and reverse speed ratios given by the Perbury gear, and therefore equation 3c corresponds to lines such as B'D' in FIG. 10. Equations 3a and 3b correspond respectively to lines AB and BD.

Equation 2 as written above is in terms of power. Changing the transmitted power to servo the engine onto its target speed is a helpful way of describing the basic mechanisms involved but, without modification, it is an inconvenient basis for a control strategy. As will now be described, preferably the torque on the drive shaft ($T_d$) rather than power ($P_d$) is used for the main servoing equation to bring the engine to the target speed $w_{et}$. The reasons for this are that if equation 2 were used at low road speeds (low $w_d$) the corresponding torque values for the torque reaction equation 1 would tend to infinity as $w_d$ approaches 0 and would change sign when $w_d$ is less than 0. In practice torque values must be limited at low road speeds (see for example FIG. 11) and furthermore the torque should remain positive when $R_a$ is greater than 0 in a forward gear even if the vehicle slides backwards ($w_d$ less than 0).

Using this approach, the drive shaft torque $T_d$ can be related to the commanded torque $T_c$ and the error in engine speed by an equation of the form:

$$T_d = T_c + k_1 R_a T_{em} [(w_e - w_{et})/w_{em}] \quad (4)$$

where $T_{em}$ is the normalising torque $P_{em}/w_{em}$, and $k_1$ is a number having a value of, for example approximately 10.

Figure 11:
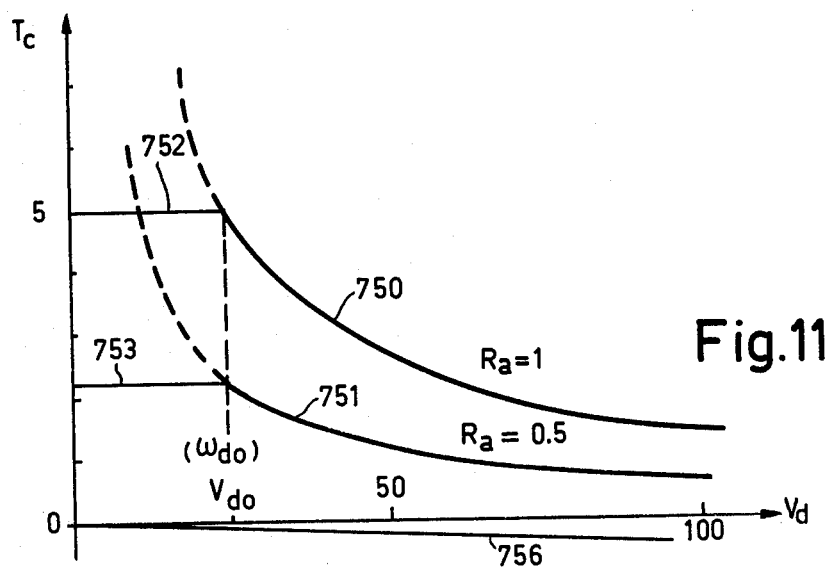
FIGS. 7 to 11 are respective graphs which illustrate the relationships between various parameters from which a suitable control strategy is determined for the arrangement of FIG. 2.

An appropriate value of torque commanded $T_c$ for equation 4 can be found from FIG. 11 which is a graph of the torque $T_c$ commanded on the drive shaft (in units of the engine torque $T_{em}$ at maximum engine power $P_{em}$) as a function of road speed $V_d$ in miles per hour (which is proportional to drive-shaft speed $w_d$) and the actuation $R_a$ of the accelerator pedal 27. For speeds above a certain value (for example $V_{do} = 25$ m.p.h.; $w_d = w_{em}/5$), $T_c$ can be given by the following normal equation (neglecting an engine braking component) which corresponds to lines 750 and 751 of FIG. 11:

$$T_c = P_c/w_d = R_a P_{em}/w_d.$$

In order to prevent excessively high torque values at low road speeds (which in practice would not be transmitted due to a hydraulic pressure limit of the CVG 11), a constant value which corresponds to lines 752 and 753 and the following equation may be used for $T_c$ for speeds below $V_{do}$, $w_{do}$:

$$T_c = P_c/w_{do} = R_a P_{em}/w_{do}.$$

It is desirable to include an engine braking component particularly when the H ("hold-low") position is selected by the driver's operation of the gearing-select lever 42. A suitable dependence of braking torque $T_{cn}$ on road speed is shown by, for example, the line 756 in FIG. 11 and given by, for example the expression $-0.4 \, T_{em} w_d/w_{em}$. The amount of engine braking should decrease with increased actuation $R_a$ of the accelerator 27 so that a function of $R_a$ should be included. This can be achieved by multiplying $T_{cn}$ by $(1 - R_a)$ so that the maximum value of positive torque (for $R_a = 1$) is not degraded when position H is selected, and the response to the accelerator 27 is always progressive.

The expression $-0.4 \, T_{em} w_d/w_{em}$ may be used for $T_{cn}$ for both the H and R (reverse) positions of the gearing-select lever 42. A smaller value of $T_{cn}$, for example $-0.2 \, T_{em} w_d/w_{em}$, may be used when position D is selected. In addition other positions of the selector lever 42 can be provided to give intermediate or larger values of $T_{cn}$; alternatively a continuous variation of $T_{cn}$ between limits could be provided by an additional continuously variable control member which is operated by the driver and is separate from the accelerator pedal 27.

The final equation for $T_c$ is therefore $$T_c = R_a \cdot P_{em}/w''_d + (1 - R_a) T_{cn} \quad (5)$$

where $w''_d = w_d$ for $w_d$ greater than or equal to $w_{do}$, and $w''_d = w_{do}$ for $w_d$ less than $w_{do}$.

It will be seen from equation 5 that $T_c$ is a function of $R_a$ and determines the use of different load-lines (such as the lines 711 and 712 in FIG. 7) for different values of $R_a$.

It will also be seen that all the terms of the main servoing equation 4 can be calculated from the values of $R_a$, $w_e$ and $w_d$ provided by the sensors (28, 29), (18, 18') and (21, 21'). Equation 4 provides the basis in accordance with which a value of $T_d$ is determined for use in the CVG control equation 1 given hereinbefore. The value of $T_d$ used in equation 1 may be that given by equation 4, for example in a steady operating regime (i.e. when the vehicle is travelling along a level road with a constant extent of actuation $R_a$ of the accelerator 27). However, it should be noted that equation 4 can give an unsuitable value for $T_d$ in particular instances. This can be easily avoided. Firstly, the servoing factor $k_1 R_a T_{em} (w_e - w_{et})/w_{em}$ can be ignored when $T_c$ is negative (i.e. by then writing $T_d = T_c$) since the engine should be treated as passive for engine braking. The magnitude of the engine braking component $T_{cn}$ should be large enough to cause the value of $w_e$ to be larger than any of the values of $w_{et}$ given by equation 3 when $R_a$ approaches zero. A most important case in which the value of $T_d$ given by equation 4 is modified before use in equation 1 is during a transient from one power load-line to another as a result of the driver changing the accelerator position $R_a$. How control equations for such a transient can be derived will be described later.

Although not generally necessary for power arrangements in accordance with the present invention, the slope of the different load-lines (for example lines 711 and 712 in FIG. 7) is also a function of $R_a$ in the specific case of equation 4. In this case, the steeply-increasing slope S of the power load-lines in equation 2 and FIG. 7 corresponds to $k_1 R_a w_d/w_{em}$ in equation 4, so that the slope itself is a function of both $R_a$ and $w_d$. Thus, for example, the different load-lines 711 and 712 shown in FIG. 7 for different values of $R_a$ are not parallel, and for very low values of $R_a$ and $w_d$ the load-lines may not be very steep. Such low values are considerably less than half the maximum values of $R_a$ and $w_d$. However, in such a situation the power arrangement is controlled primarily by the throttle 35 and the throttle setting can even be used to servo the engine speed towards its target value.

The electronic control system 26 not only regulates the torque transmitted by the CVG 11 but also regulates (by means of the throttle 35) the torque produced by the engine 1. As described hereinbefore, the throttle opening is determined by the output signal $R_t$ from system 26. There are significant advantages in having the throttle 35 operated by the control system 26, particularly for engine braking and at low road speeds. An improvement in responsiveness to a sudden power demand is also possible.

The Perbury gear-box being efficient gives a very high torque multiplication at high speed ratios, (for example low $w_d$, high $w_e$). To protect the gear-box a pressure limit is set so the control pressure and hence the torque reaction $T_{ra}$ is limited. This limit implies that for low values of $w_d$ when the engine torque $T_e$ exceeds a certain value the engine speed $w_e$ would be no longer controlled by the CVG. If the throttle 35 were directly connected to the accelerator 27 and opened wide all the extra power would be dissipated either in the engine or the gear-box. This would be wasteful of fuel and the dissipation in the gear-box could be higher than in normal operation; the power is proportional to engine speed which can be higher than the normal maximum. Furthermore only a small throttle opening is needed at low road speeds to reach this torque limit so the response to the accelerator pedal 27 if directly connected to the throttle 35 would be extremely sensitive compared with its behaviour at higher speeds. These disadvantages are avoided because the throttle 35 is managed by the control system 26. The strategy is based on relating the torque $T_c$ commanded on the drive shaft 14 to the drive shaft speed $w_d$ as previously described with reference to FIG. 11. Above the threshold speed $V_{do}$, $w_{do}$ full actuation of the accelerator 27 commands full engine power and the throttle opening can be directly related to $R_a$. Below the speed $V_{do}$, $w_{do}$ the torque limit would be reached by maximum engine power so the throttle opening for a given $R_a$ is reduced so that the drive shaft torque for a given accelerator position is approximately constant. The response to the accelerator is therefore progressive even at low road speeds and the hydraulic limit on the torque reaction is merely a second line of protection against a fault condition.

The regulation of throttle 35 by the control system 26 is also advantageous for engine braking. Thus, the initial movement (low $R_a$ values) of the accelerator pedal 27 can be used to control engine braking along the operating line DE, when desired, and the throttle opening during engine braking can be very small or completely closed so as not to consume extra fuel when the engine braking effort is reduced from the maximum value corresponding to $R_a = 0$. For larger values of $R_a$ the throttle 35 can be progressively opened.

Thus, the value of the commended torque $T_c$ given by equation 5 can also be used in determining the throttle output $R_t$ as will now be described.

Figure 9:
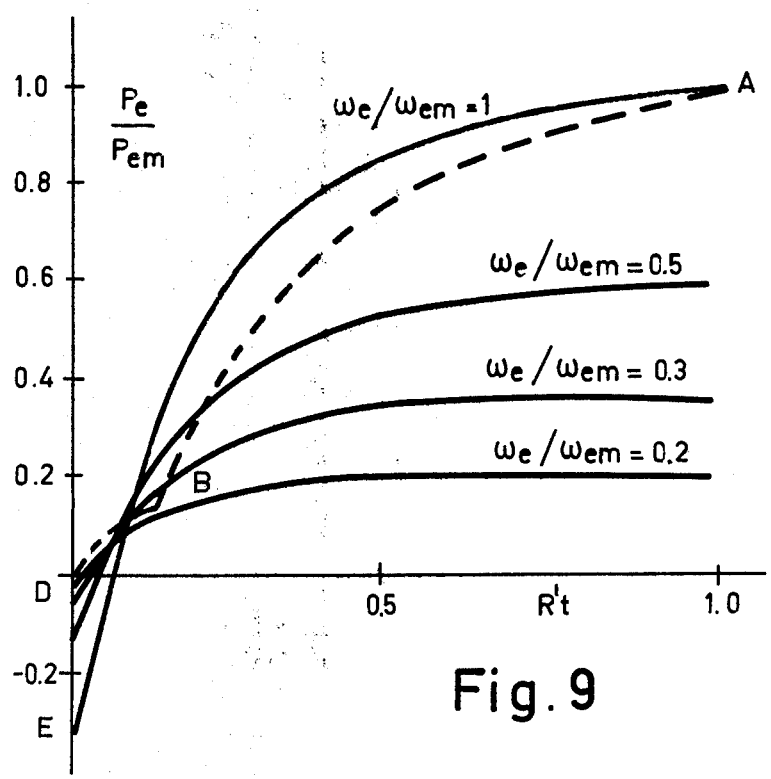

FIG. 9 indicates the relationship between throttle position $R'_t$ and engine power $P_e$ for various engine speeds $w_e$. The target engine speed (for low road speeds) as a function of engine power which is given by the line ABD in FIG. 1 can therefore be used in FIG. 9 to find the corresponding line ABD relating engine power $P_e$ to $R'_t$. Since in the steady state the power produced equals the transmitted power the line ABD in FIG. 9 also gives the value of $R'_t$ at each intersection ($P_o$, $w_{et}$) of the $P_d$ load-lines with the line ABD in FIG. 7. Thus a value for $R'_t$ used as a function of the engine power commanded $P_c$ can be derived from the line ABD in FIG. 9 (or an approximation to it). As an example of the type of approximation that might be used, $R'_t$ might be defined by two straight lines which intersect in the region between the point A and the point B, namely:

$$R'_t = 0.6\, T_c w'_d/P_{em} \qquad (6a)$$

$$\text{or } 5\, T_c w'_d/P_{em} - 4 \qquad (6b)$$

whichever is the larger.

In these equations 6a and 6b, $T_c$ is the value of the commanded torque given by equation 5. $w'_d$ is an effective value of $w_d$ used to estimate the engine power required ($P_c = T_c\, w'_d$). If the gear-box 11 were lossless (which it is not), $w'_d$ would theoretically equal $w_d$ but in practice $R'_t$ has to be increased with increasing $T_c$ even when $w_d$ approaches 0. A suitable expression for $w'_d$ is given by, for example, the following equation:

$$w'_d = w_d \pm d$$

where $d$ is a constant chosen to give an adequate throttle opening even under worst case conditions of engine 1 and gear-box 11, and is added to $w_d$ if $w_d$ is positive and subtracted from $w_d$ if $w_d$ is negative.

It should be noted that at low road speeds (as $w_d$ approaches 0) the servoing action on engine speed due to the torque load given by equation 4 has a weak effect since the power load variation with engine speed is small ($P_c = w'_d \cdot T_d$). This is a fundamental restriction since $T_d$ is in any case limited by the hydraulic limit placed on the torque reaction to protect the gear-box from overload. Thus at low road speeds it is the throttle setting that largely determines the engine speed which will tend to rise almost to the no load value. This implies that if $d$ is made large enough to give an adequate engine speed near $w_{et}$ in the worst case, an engine in good condition will reach a speed substantially in excess of $w_{et}$ (reaching for example approximately 2,000 r.p.m. when $R_a = 1$). This would not really be objectionable as long as the value of $k_1$ in equation 4 is not so large that $T_d$ is then greatly in excess of $T_c$. The value of $k_1$ proposed ($k_1 = 10$) may be appropriate since when $R_a = 1$, $T_c = 5T_{em}$ for $w_d$ less then $w_{do}$ so an excess engine speed of 1,000 r.p.m. would only cause $T_d$ to be 40% above $T_c$. At higher road speeds the change in power load on the engine with engine speed (due to the servoing term in equation (4) becomes proportionately larger so $k_1 = 10$ should be a large enough value to give good control of engine speed in the main working range (above for example 20 m.p.h.).

As indicated in FIG. 8, the power available to accelerate the engine flywheel ($P_{ef}$) depends on the difference between the engine power and the transmitted power. The effective delay time can be reduced somewhat by a transient excess opening of the throttle 35, using the throttle control $R_t$ as well as the CVG control to servo the engine 1 towards its new target speed. Thus, more precise control can be provided by adding to the throttle setting value $R'_t$ a servoing term which could be of the form:

$$k_2(w_{et} - w_e)/w_{em}.$$

The servoing term also causes the throttle to be opened slightly if $w_e$ is less than $w_{et}$ during engine braking. This occurs if the value of $w_{et}$ is set by equation 3c (or equation 3d in reverse), and $-T_c$ is insufficiently large to maintain the engine speed above $w_{et}$ when the throttle is closed. By opening the throttle slightly the gear-box is maintained in its normal operating range whereas otherwise the gearing limit could be reached, and the rollers might slip because the end thrust may be inadequate to transmit the torque needed to maintain engine speed with a closed throttle. To assist the servoing term it may also be desirable to add a small dead-reckoning term to allow for the increased throttle opening needed to idle the engine above the normal idling speed. Using both the servoing and the dead reckoning term to modify the value of the throttle setting $R'_t$, the output control signal $R_t$ would be for example $$R_t = R'_t + k_2(w_{et} - w_e)/w_{em} + k_3 w_{et}/w_{em} \qquad (7)$$

where $k_2$ is a number in the region of 0.2,
and $k_3$ is a number in the region of 0.05,
and $R'_t$ is given by equation 6.

The output $R_t$ given by equation 7 is therefore of the general form:

$$R_t = Y_1 T_c w_d + Y_2(w_{et} - w_e) + Y_3 w_{et} + Y_4$$

where $Y_1$, $Y_2$, $Y_3$ and $Y_4$ are constants of which at least $Y_1$ and $Y_2$ may have different values for different ranges of $T_c w_d$.

The output signal $R_t$ regulates the engine throttle 35 in terms of a target operating point at the intersection of an engine power curve (such as line 701 in FIG. 7) corresponding to $R_t$ and the target operating line ABD. The output signal $T_{ra}$ regulates the gear ratio of the CVG 11 in terms of a target operating point at the intersection of a power load line (such as line 711 in FIG. 7) and the target operating line ABD. Since different approximations may be used for the target line ABD in calculating $R_t$ and $T_{ra}$ (see for example equations 3 and 6 and FIGS. 9 and 10) these target operating points may not be identical. However, in practice such an imbalance is cured by power flow ($P_{ef}$) between the engine 1 and drive shaft 14 which will increase or decrease the engine speed $w_e$ until the arrangement stabilizes on a single operating point (such as point Q in FIG. 7) which is determined in accordance with the engine power curve (such as line 701 in FIG. 7) and the power load line (such as line 711).

The control of transients when a driver changes the accelerator position $R_a$ was mentioned with reference to FIG. 8. As discussed with reference to, for example, the line QR' of FIG. 8, when the driver increases or decreases $R_a$ he should if possible be given some corresponding change in torque almost immediately. However, when $R_a$ increases it is usually necessary for the engine speed $w_e$ to increase to be able to sustain the higher power required, so any increase in drive shaft torque $T_d$ given almost immediately must not be so great as to prevent the engine accelerating at a reasonable rate to the new target value. Since the action of opening the engine throttle 35 (in response to an increase in $R_a$) cannot be relied on always to produce any particular increase in engine torque (for example because of a flat spot or plug misfiring) it appears necessary to derive and use information about engine acceleration to define how large an increase in drive shaft torque $T_d$ to provide during the transient.

By storing the preceding value of $w_e$, the change $\Delta w_e$ in engine speed over the preceding period $\Delta t$ can be obtained by subtracting this stored value from the next measured value of $w_e$. The period of $\Delta t$ can be the period of time between measurements of $w_e$. The value of $T_d$ derived in accordance with equation 4 can thus be up-dated at the end of each period $\Delta t$; an appropriate value of $T_d$ to use during a transient would be, for example:

$$T'_{d(n)} = T_{d(n-1)}[1 + (\Delta w_e - e)/w_e] \qquad (8a)$$

where $T_{d(n-1)}$ is the value of $T_d$ used in the previous period,
$\Delta w_e$ is the increase in engine speed over the last period, and
$e$ is a constant with the dimensions of $w_e$.

If the value of $e$ approached 0 equation 8a would imply that $T_d$ would rise almost in proportion to engine speed (but at a slowly decreasing rate as $w_e$ rises) giving an almost constant torque load on the engine during the transient. This would result in very little torque being available to accelerate the engine so $e$ should be made a constant greater than 0. Its value should be chosen such that $T'_{d(n)}$ is greater than $T_{d(n-1)}$ only when the engine is accelerating at an appropriate rate (for example $\Delta w_e/\Delta t$ at least as great as 2,000 r.p.m./sec.).

Using a positive value of $e$ corresponds to an engine torque load which is decreasing with time. When $R_a$ is decreasing this would cause the engine speed to fall unduly slowly to its new target value. Thus when $R_a$ is decreasing the sign of the constant term should be changed, giving $$T'_{d(n)} = T_{d(n-1)}[1 + (\Delta w_e + e)/w_e] \qquad (8)b$$

At the start of a transient $T_{d(n-1)}$, of course, equals the value of $T_d$ given by the basic servoing equation 4.

The occasions when equation 8a or 8b should be used in the torque reaction control equation 1 to define $T_{ra}$ can be found by comparing the actual measured value of $R_a$ with a history-dependent value $R'_a$ which follows a staircase towards the present value. The staircase can be defined in the following way $$R'_{a(n)} = R'_{a(n-1)} + r, \text{ if } R'_{a(n-1)} \text{ is less than } (R_a - r) \qquad (9a)$$

$$R'_{a(n)} = R'_{a(n-1)} - r, \text{ if } R'_{a(n-1)} \text{ is greater than } (R_a + r) \qquad (9b)$$

otherwise $R'_{a(n)}$ is set equal to $R_a$. $\qquad (9c)$ $r$ is a constant. In choosing the value of $r/\Delta t$ a maximum duration of transient (when $R_a$ changes from 0 to 1) of about 2 seconds, may be appropriate (assuming $\Delta w_e/\Delta t$ at least as great as 2,000 r.p.m./sec.) which implies that $r/\Delta t$ should be in the region of 0.5. However it will normally be appropriate to use the equation 4 value of $T_d$ in equation 1, (i.e. terminate the transient) before $R'_a$ has reached $R_a$ since equations 8a or 8b should only be used when they give a value of $T'_d$ more in line with the driver's intentions than the value of $T_d$ given by equation 4. Thus the procedure can be summarised generally as follows:

If $R'_{a(n-1)}$ is less than $(R_a - r)$ the value of $T_d$ used to define $T_{ra}$ is that given by equation 8a or 4 whichever is the larger.

If $R_{a(n-1)}$ is greater than $(R_a + r)$ the value of $T_d$ used is that given by equation 8b or 4 whichever is the smaller.

Whenever equation 4 is used the transient is deemed to be terminated and $R'_a$ is set equal to $R_a$.

Reference will now be made again to the torque reaction control equation 1 and the change of mode for the CVG 11. A mode change is made when the ratio of input and output speeds is essentially the same in both modes, e.g. at an overall ratio of 0.33 for an epicyclic ratio of 2. However two aspects have to be considered in addition to the speed ratio.

When the mode changes the drive shaft torque is differently related to the torque reaction as shown in equation 1. The control system uses this equation to find the appropriate torque reaction pressure (proportional to $T_{ra}$) for the present transmitted power $P_d(= T_d w_d)$ so no discontinuity in $P_d$ occurs. The value of $T_{ra}$ is changed by a factor of minus 2, from $-0.67T_d$ to $+1.33T_d$ for a transition between the modes. The reversal in sign is obtained with the reversing valve 635 of FIG. 6 which applies the control pressure to the opposite side of the control piston 633. The control signal Gm3 for valve 635 is determined in accordance with the sign of the output $T_{ra}$. The factor of 2 is of particular significance because the change in torque reaction, if not compensated by a corresponding change in control pressure, would cause the rollers in rolling assembly 12 to reach the end of their travel in the new mode. For example at a mode I to mode II transition the control piston 633 would move rapidly to the lowest ratio in mode II and the end load on the rolling assembly 12 would then be insufficient for the transmitted torque $T_d$.

The second aspect is that when the mode is changed it is undesirable for a reverse change to be made almost immediately. This could be avoided by using a time delay but if the driver changes his power requirement during this time the rollers of the rolling assembly 12 can again reach the end of their travel. A better solution is to increase the target engine speed $w_{et}$ in mode I (for example, $w_{et} + w$) relative to the values so far proposed (which can still be used for mode II) so that whenever a mode change is made the gear ratio tends to move towards the centre of the new range. Only a very short time delay would then be sufficient, just long enough to prevent a reverse transition while the ratio remained within the synchronous speed band.

FIG. 3 shows an example of an electronic control system 26 in accordance with the present invention and suitable for use in the arrangement of FIG. 2. The system 26 receives the input signals $t_e$, $t_d$, $R_a$ and (D, H, N, R) and provides in response thereto the output signals $R_t$, $T_{ra}$, Gm1, Gm2 and Gm3.

The control system shown in FIG. 3 is a microprocessor system based on a general-purpose microprocessor device 300 and having various external memory and input/output devices, for example devices 331, 332, 342, 343, 352, 353, 361, 362, 370 and 371. The microprocessor device 300 is a semiconductor integrated circuit which typically comprises several thousands of transistors connected together in the same device by large-scale integration (LSI) techniques so as to provide register and logic circuits which together implement the central processing and control functions of a microcomputer. The commercially available Type 2650 microprocessor of the Signetics Corporation of U.S.A. is suitable for use as the device 300 of FIG. 3. It will be evident however that many other commercially available microprocessors can be used in the arrangement of FIG. 3. The specific structure, organisation and manner of programming of the Signetics 2650 microprocessor are readily available in issued manuals and literature, such as for example the manual entitled "Signetics Microprocessor 2650" published by Signetics Corporation, 811 East Arques Avenue, Sunnyvale, Calif. 94086, U.S.A. and Copyright 1975. The whole contents of this manual which is available from suppliers of Signetics devices both in this and other countries are hereby incorporated by reference into the present Specification and are not specific to the present invention, and so they will not be described in detail in the present Specification. The device 300 merely uses known data processing techniques to calculate values for outputs $R_t$, $T_{ra}$, Gm1, Gm2, and Gm3 from the relationships and equations given herein in terms of the input parameters $w_e$, $w_d$, $R_a$ and (D, H, N, R). The way in which the general-purpose device 300 should be programmed in order to perform this function for the vehicle power transmission arrangement of FIG. 2 will be described later with reference to FIG. 4.

Referring now to FIG. 3, connections are shown to terminals 302 to 326 of the microprocessor device 300. These terminals correspond to terminal pins of the Signetics Type 2650 microprocessor in the following manner.

Terminal 302 corresponds to the "CLOCK" pin of the Signetics 2650 microprocessor and is the clock input which provides the basic timing information that the processor 300 uses for all its internal and external operations. FIG. 3 shows a conventional clock 330 connected to terminal 302 and providing a single phase pulse train. The clock rate determines the instruction execution time. For the arrangement of FIG. 2, a 800 kHz (kilo cycles per second) clock rate may be used for a Signetics Type 2650 Microprocessor in the system of FIG. 3.

Terminal 303 corresponds to the Signetics "SENSE" pin and is a direct input to the 2650 Microprocessor which is completely independant of the other inputs and outputs. "SENSE" terminal 303 is used in the system of FIG. 3 to cause the main control programme indicated in FIG. 4 to be re-run, as will be explained later.

Terminals 304 to 311 correspond to the eight "DBUS to DBUS7" pins of the Signetics 2650 Microprocessor. These form the 8-bit, bidirectional data bus over which data is communicated into and out of the 2650 processor. Each of these eight terminals is tri-state and as such may be at a high level, a low level or open-circuit.

Terminals 312 to 321 correspond to ten of the thirteen "ADR0 to ADR12" pins of the Signetics 2650 Microprocessor. These provide an address bus for memory access and input/output instructions.

Terminal 322 corresponds to the "M/IO" pin of the Signetics 2650 Microprocessor and is used to inform external devices whether memory or input/output functions are being performed. Terminal 322 is at a high level for memory instructions and a low level for input/output instructions.

Terminal 323 corresponds to the Signetics "OPREQ" pin which is an operation request output signal that informs external devices that the information on other output pins is valid.

Terminal 324 corresponds to the Signetics "WRP" pin at which a write pulse is generated during write sequences and may be used to strobe memory or input/output devices.

Terminal 325 corresponds to the Signetics R/W pin, the output signal of which describes an input/output or memory operation as a "READ" operation if the signal is low level or a "WRITE" operation if the signal is high level. This output signal defines whether the bidirectional data bus of terminals 304 to 311 is transmitting or receiving data, and is used in the system of FIG. 3 only in relation to the read/write memory device 332.

Terminal 326 corresponds to the Signetics "RESET" pin and is an input used to cause the 2650 Microprocessor to begin processing. When the vehicle ignition is turned on by the driver's operation of the ignition switch 389, the vehicle battery is connected to a power supply circuit 388 which provides an output connected to a one-shot or monostable circuit 387. The monostable 387 thus produces a short pulse when the vehicle ignition is first turned on, and this pulse is the input on terminal 326 to begin processing.

Although not shown in FIG. 3 for the sake of simplicity, the power supply 388 is connected to two other terminals of the microprocessor device 300 which correspond to the "VCC" pin and the "GND" pin of the Signetics 2650 microprocessor. The "GND" pin is the logic and power supply ground for the processor. The Signetics 2650 microprocessor, for example, uses low threshold voltage, ion-implanted, n-channel silicon-gate MOS transistor technology to allow operation from one +5 volt power supply connected to the "VCC" pin. However, as mentioned hereinbefore other types of microprocessor may be used instead of the Signetics 2650.

Memory devices 331 and 332 are associated with the microprocessor device 300 as shown in FIG. 3. Device 331 is a Read-only memory (ROM) which can be any of many commercially-available ROM devices compatible with microprocessor 300. This ROM device is programmed to store the computer programme including the main control routine indicated in FIG. 4 by which the general-purpose microprocessor 300 operates to determine the system outputs from the relationships and equations given hereinbefore. The ROM device also stores the values of various constants such as for example $P_{em}$, $w_{em}$, $T_{em}$, $d$, $m$, $m'$, $k_1$, $k_2$, $k_3$, $e$, $w$, and $r$ used in defining these relationships. A table of reciprocal values is also stored in the ROM 331 and is used in converting the $t_e$ and $t_d$ inputs into values of $w_e$ and $w_d$ for use in these relationships by the microprocessor 300. The device 332 is a random access read/write memory (RAM) which extends the capacity of the internal general purpose read/write registers of the microprocessor 300 and is used together with these registers to temporarily store, for example, both present and previous values of $w_e$, $T_d$, $R_a$ and present values of the other variable parameters as well as intermediate results which the microprocessor 300 uses in implementing the control routine. Device 332 may be any of many commercially-available RAM devices.

The various other addressing and input/output devices indicated in the microprocessor system of FIG. 3 may also be any of many commercially-available devices.

The transducer signals $t_e$ and $t_d$ representative of the revolution periods of the engine 1 and drive shaft 14 are passed through shaping circuit 335 and shaping and logic circuit 336 respectively and are then used to gate a constant frequency pulse train from clock 337 into counters 338 and 339 respectively, along connections 392. The circuits 335 and 336 each produce from a one-shot or monostable circuit (the terms hereinafter being used interchangeably) an output in the form of a high-level pulse the amplitude of which is suitable for gating the binary counters 338 and 339 and the duration of which normally corresponds to the time taken for a tooth of the wheels 18 and 21 to pass the transducers 18' and 21'. The time constant of each monostable is longer than the time between the passage of teeth past the transducers at the lowest shaft speed for which a measurement is required, for example 60 revolutions per minute. Each counter 338, 339 is reset by a differentiated output from the corresponding monostable of circuit 335, 336 when the monostable switches to its stable state (high level). This stable high state is used to gate the clock pulses into the counter 338, 339.

If, for example, 3% accuracy is to be maintained for the values of the speed parameters $w_e$ and $w_d$ at high speeds, a minimum of, for example, 33 pulses should be counted by the counters 338 and 339 for each transducer pulse at a top speed of, for example, 6,000 revolutions per minute (100 revs/sec.). Assuming the wheels 18 and 21 each have "$n$" teeth with a 1:1 mark/space ratio, such a degree of accuracy at high speed would require 33 pulses in $5/n$ milliseconds, which means a minimum clock rate of $6.6\,n$ kilo Hertz (k.Hz). At a low drive-shaft speed, for example, 60 rev/minute the pulse count will be for example 3,300 so that this determines the minimum capacity for the counter 339 as for example 12 bit. The control system of FIG. 3 may be operated with, for example, two teeth per wheel ($n = 2$), 12-bit counters 338 and 339 and a frequency of 16.4 k.Hz for clock 337.

However at very low shaft speeds the counters 338 and 339 would be filled, and further clock pulses would cause the counters 338 and 339 to reset and begin counting from zero. To prevent such resetting, "AND" gates are provided within each counter 338 and 339 to provide a signal on connection 393 when the counter is full. Such signals on connections 393 are applied (together with the input from clock 337) to the inputs of separate "AND" gates for each counter, and prevent further clock pulses from reaching the full counter along connection 392. These separate "AND" gates comprise circuit 391 in FIG. 3.

As described hereinbefore, the two signals $t_d$ from the transducers 21' are shifted in phase. The circuit 336 also includes logic for deriving from these two signals $t_d$ a signal representative of the direction of rotation of the drive-shaft 14. This is achieved by differentiating one of the two signals $t_d$ to produce a positive pulse for each positive-going edge of this one signal $t_d$ and a negative pulse for each negative-going edge. This differentiated output is then inhibited when the other signal $t_d$ is high, so that the output of the inhibit circuit is either a train of positive pulses or a train of negative pulses depending on the direction of rotation of the shaft 14. This train of either positive or negative pulses is applied to the two inputs of a bistable circuit one of which inputs includes an inverting amplifier. The output from the bistable is thus either a "1" or "0" depending on the direction of rotation of the shaft 14. In this way the control system 26 is informed whether the vehicle is moving forwards or reversing. This additional signal from the circuit 336 forms an additional bit which can be read into the microprocessor 300 together with the 12-bit count corresponding to the magnitude of $t_d$.

The output from the monostable in the shaping circuit 335 is applied also to another monostable 340. When the output of the monostable in circuit 335 goes low the monostable 340 produces a high output for a time which is short compared with the time required to run the main control programme indicated in FIG. 4. The output of monostable 340 is applied to the "SENSE" terminal 303 of the microprocessor 300 and causes the main control programme to be re-run.

As the main control programme run is thus normally synchronised with the pulse train from the engine-speed transducer 18', the time at which the microprocessor programme reads the engine-speed information from counter 338 is arranged to occur when the counter 338 is static. Thus, simple tri-state gates 342 and 343 with gate-enable lines 344 and 345 respectively are adequate to interface the counter 338 with the data bus lines 348. The separate enable lines 344 and 345 allow the microprocessor 300 to read the first 8 and last 4 bits of 12-bit counter 338 separately over the same 8-bit data bus lines 348.

However, the drive-speed transducer output is not synchronised to the programme running time and therefore the use of input-output ports 352 and 353 each comprising storage as well as tri-state gating functions is necessary between the counter 339 and the data bus lines 348. The stores of these ports 352 and 353 can be up-dated by using the output pulse from the circuit 336 to trigger a monostable 355 which controls the input to both ports 352 and 353. These stores can be separately read by the microprocessor 300 by means of their separate gate-enable lines 356 and 357. If the circuit 336 and microprocessor 300 choose the same time for both up-dating and reading these stores, the up-dating instruction is overridden by the read-enable pulse on gate-enable lines 356 and 357 being also applied to an inhibiting gate 354 at the input of monostable 355.

The other input signals $R_a$ and (D, H, N, R) are derived from potentiometer 28 and the gearing-select switch 41 respectively. The analogue accelerator position signal $R_a$ is converted to digital form (for example as a 7-bit number) by the analogue-to-digital converter 360. This digital signal $R_a$ and the digital input (D, H, N, R) are fed to the data-bus lines 348 via separate tri-state gates 361 and 362 respectively, each of which has a separate gate-enable line 363 and 364 respectively.

There are five output signals $R_t$, $T_{ra}$, Gm1, Gm2, and Gm3 derived from the electronic control system of FIG. 3. The value of each of these must be maintained static until up-dated. This is effected by the two 8-bit stores 370 and 371 each having an up-date enable line. The reaction torque $T_{ra}$ is output from the data bus lines 348 to the store 370 in the form of 7-bits corresponding to the magnitude of $T_{ra}$ and an eighth bit (the sign bit) which is the sign of $T_{ra}$ and thus corresponds to Gm3. This eighth bit is amplified by power amplifier 47 (which is also shown in FIG. 2) and then applied to the solenoid of the reversing valve 635. The 7-bit magnitude of $T_{ra}$ is converted to an analogue signal by the digital-to-analogue converter 372, amplified by the amplifier 48 (which is also shown in FIG. 2 and which may be a pulse-width modulation amplifier), and then applied to the solenoid of the pressure control valve 638. The output signals $T_{ra}$ and Gm3 are therefore derived as a single 8-bit word.

The outputs signals $R_t$, Gm1 and Gm2 may also be derived as a single 8-bit word and held in store 371. Because Gm1 and Gm2 are digital signals of which one is high while the other is low, they can both be represented by a single-bit. No sign is required for the throttle position output $R_t$ which can be represented in 7-bits, so that this single-bit for Gm1, Gm2 can be incorporated as the least significant digit for output from the microprocessor 300 in the form of a 8-bit word with $R_t$. The 7-bit number for $R_t$ is converted to analogue form by the digital-to-analogue converter 374 and then applied to the throttle servo amplifier 38 (in FIG. 2) to control the throttle opening of the engine 1. The eighth bit representing both Gm1 and Gm2 is amplified by power amplifiers 45 and 46 which are also shown in FIG. 2 and one of which produces an inverted signal. These two signals Gm1 and Gm2 are then applied to the solenoids of the on-off valves 610 and 612 to control the epicyclic clutches of the CVG 11.

The signals from the M/IO, OPREQ and WRP terminals 322, 323 and 324 respectively of the microprocessor 300 are decoded in logic gates 380 to enable the address bus lines 381 to interrogate these input devices and up-date these output devices. As the Signetics Type 2650 Microprocessor has more address lines available than the input and output addresses require, a separate line is used for each device 342, 343, 352, 353, 361, 362, 370, 371, and address decoding for these input/output devices is not necessary.

The signals from the M/IO, OPREQ and WRP terminals 322, 323 and 324 and the two most significant address bit terminals 320 and 321 are combined and decoded in logic gates 382 to provide a memory enable signal which is output from gates 382 to the memory devices 331 and 332. The memory enable signal determines that access to memory is required and distinguishes between different memory packages of these devices 331 and 332. The RAM device 332 also requires from the R/W terminal 325 a read or write command as either is possible with device 322.

Buffers 385 are included to provide sufficient power on bus lines 348 and 381 to enable the data bus and address bus outputs from terminals 304 to 321 of microprocessor 300 to drive the many external memory and input/output devices shown in FIG. 3.

As already mentioned the programme for microprocessor 300 is started by a high input signal on "RESET" terminal 326 derived from the ignition switch 389. This causes the microprocessor 300 to start a preliminary programme run in which all bits present in the read-write memories are set to "0" and the microprocessor 300 then prepares to implement the main control programme indicated in FIG. 4. FIG. 4 illustrates the main control routine used to operate the microprocessor 300 so as to provide the outputs $R_t$, $T_{ra}$, Gm1, Gm2 and Gm3 in accordance with the relationships and equations given hereinbefore.

In the accompanying flow-chart of FIG. 4, instructions are represented by rectangular boxes, decisions are represented by diamond-shaped boxes, and the "Yes" or "No" answer to any decision is represented by different exit paths from the diamond-shaped box which are labelled "Y" or "N" respectively. The length of the flow-chart necessitates the use of several sheets of drawings, i.e. FIGS. 4a to 4d, however it should be understood that within this sequence of drawings the exit path from the last box of one sheet forms the input path for the first box of the next sheet.

Figure 4A:
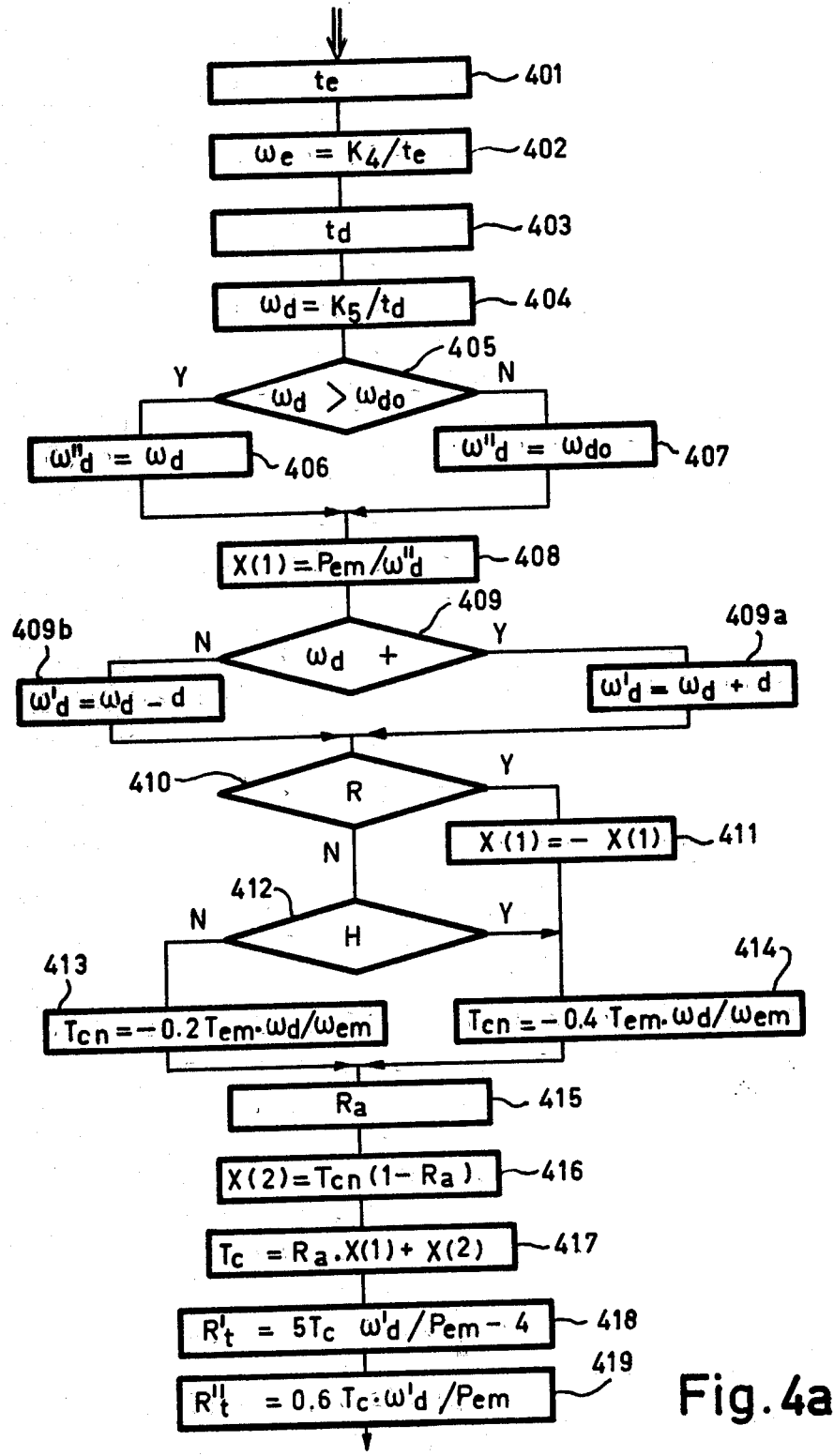
FIG. 4 is sub-divided into FIGS. 4a, 4b, 4c and 4d, which together form a flow chart of a suitable control strategy which can be performed by the control system for the arrangement of FIG. 2.

As indicated by instruction box 401 in FIG. 4a the first significant operation performed by the microprocessor 300 in the main control routine is to read the value of $t_e$ from counter 338 via the gates 342 and 343. The microprocessor 300 then determines the value of $w_e$ (engine speed) corresponding to the value of $t_e$ by consulting the table of reciprocal values stored in the ROM device 331. This is indicated by instruction box 402 in FIG. 4a. The value of $w_e$ is given by the expression $k_4/t_e$ where $k_4$ is a constant determined by the number of teeth on disc 18 and the frequency of clock 337. The value of $w_e$ obtained is then stored in the usual manner in one of the read-write memories of the microprocessor system (for example in RAM device 332 or in an internal register of the microprocessor 300).

It should be noted that functions which recur in the programme can be brought out of the main programme illustrated in FIG. 4 in order to minimise programme size and therefore the necessary storage for the whole programme. Such a practice is well-known and conventional in the data-processing art, and will not therefore be described in detail herein. These recurring functions then form subroutines which are entered from the main routine and which on completion return to the main routine. Any such subroutine may itself contain subroutines. The Signetics Type 2650 microprocessor can handle eight levels of subroutines (i.e. one within the other) which is more than adequate for controlling the arrangement of FIG. 2. The main control routine illustrated in FIG. 4 may use subroutines for the steps involved in, for example, multiplication of two numbers, division of two numbers, overflow control to prevent loss of the most significant bit of a computed value, rotation of a number to the left or right when dealing with the different orders of magnitude represented by the different bits in the number, and the reciprocal function for $w_e$ and $w_d$. Thus, instruction 402 in FIG. 4a would involve entering the reciprocal subroutine, and depending on the organisation of the reciprocal tables may also involve a further subroutine for multiplication by $k_4$.

After obtaining $w_e$, the value of $t_d$ is similarly read from the ports 352 and 353 in accordance with instruction 403 and is similarly converted to the corresponding value of $w_d$ in accordance with instruction 404 by consulting the reciprocal table in device 331. The value of $w_d$ is given by the expression $k_5/t_d$, similar to that for $w_e$. If for example discs 18 and 21 have the same number of teeth, $k_4$ may equal $k_5$.

The microprocessor 300 then uses its arithmetic/logic unit to compare the value of $w_d$ so obtained with the constant value $w_{do}$ which is read from ROM device 331 and so performs the decision 405 in FIG. 4a. If $w_d$ is greater than $w_{do}$ the value of $w''_d$ for equation 5 (given hereinbefore) is $w_d$ but if $w_d$ is not greater than $w_{do}$, $w_{do}$ is used for $w''_d$. This is shown in FIG. 4a by the different instructions 406 and 407 in the Y(Yes) and N(No) exit paths from decision box 405. Having obtained $w''_d$, instruction 408 may now be performed to obtain an intermediate result X(1) for use in equation 5, namely $$X(1) = P_{em}/w''_d.$$

$P_{em}$ is of course read from ROM device 331 and the result X(1) is of course then stored in one of the read-write memories.

Decision 409 is then effected by examining the sign bit of the temporarily stored $w_d$ value. If $w_d$ is positive, instruction 409a adds the constant $d$ which is of course read from ROM device 331. If $w_d$ is negative, instruction 409b subtracts the constant $d$. The result $w'_d$ is then stored for subsequent use in the throttle control equation 7.

Decision 410 is then effected by reading the position of switch 41 via gate 362 to determine whether or not reverse (R) is selected. If it is (Y-exit from 410), instruction 411 writes X(1) as a negative number. If R is not selected, decision 412 is then effected to determine if H(Hold-low) position is selected, and if it is not a value for the engine braking factor $T_{cn}$ is then determined by instruction 413 in accordance with the expression $T_{cn} =$ $-0.2\ T_{em}\ w_d/w_{em}$. If either R or H is selected $T_{cn}$ is then determined by instruction 414 in accordance with the expression $T_{cn} = -0.4\ T_{em}\ w_d/w_{em}$. The value of $T_{cn}$ is then stored.

The microprocessor 300 then executes instruction 415 to read $R_a$ from device 360 via gate 361.

The desired magnitude X(2) of engine braking component is then calculated in accordance with instruction 416 from the equation $X(2) = T_{cn}(1 - R_a)$. Instruction 417 then adds X(2) to the value of X(1) multiplied by $R_a$ to give a value $T_c$ for the torque commanded by the vehicle driver in accordance with equation 5 given hereinbefore. This value $T_c$ is then stored to be used for deriving both the output signals $R_t$ and $T_{ra}$ for the throttle 35 and CVG 11 respectively.

Figure 4B:
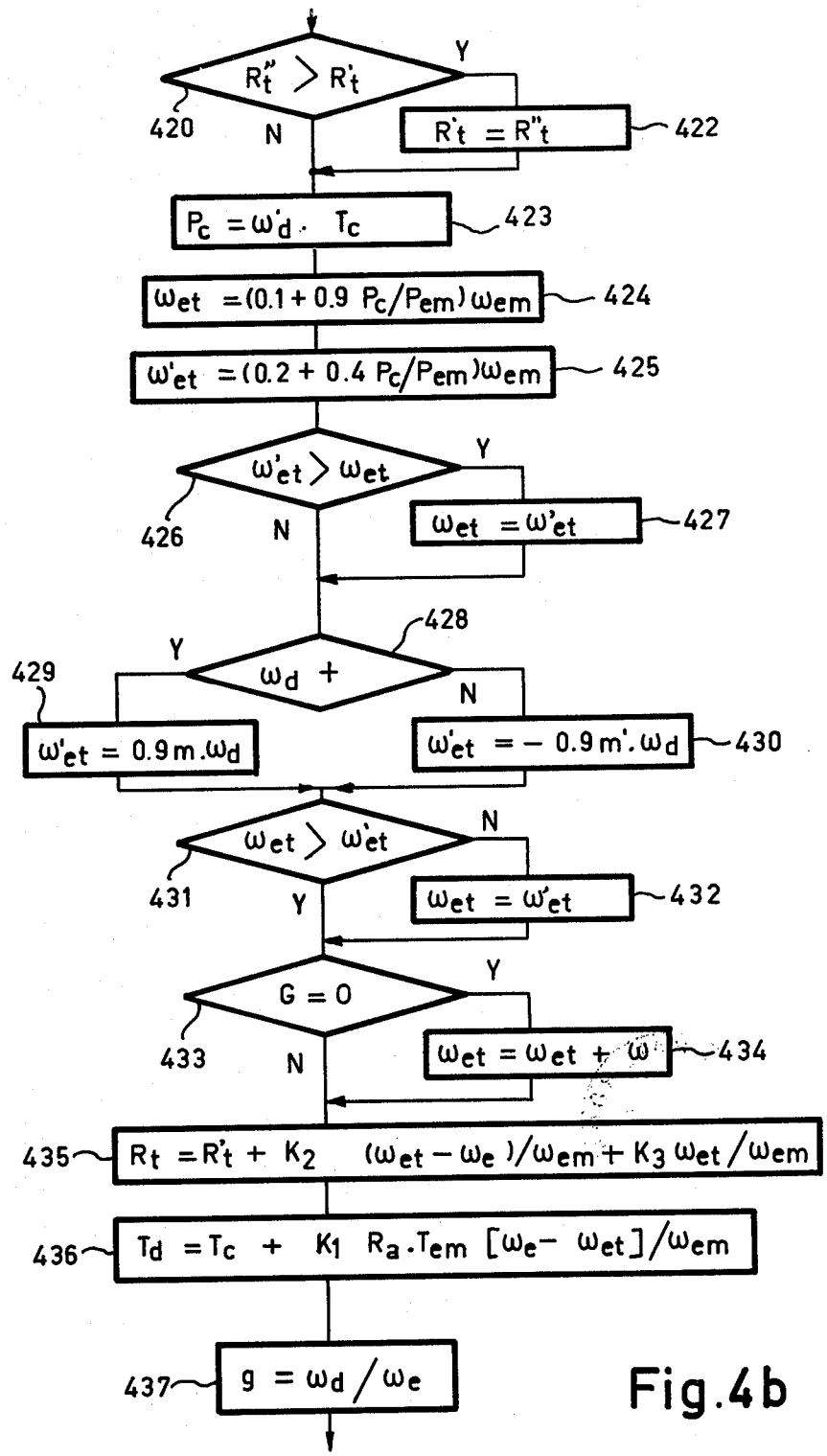
Figure 4:
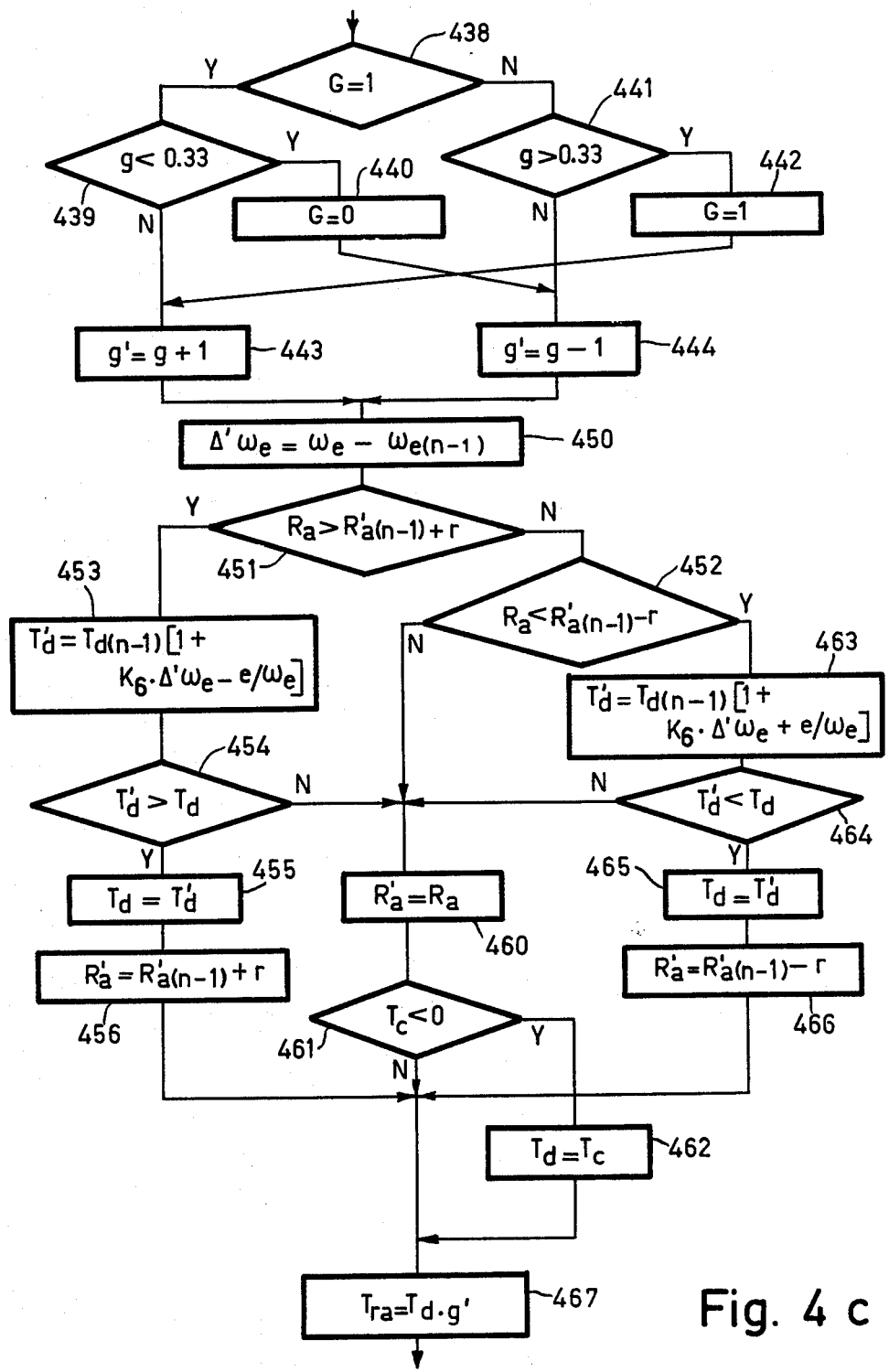
Figure 4D:
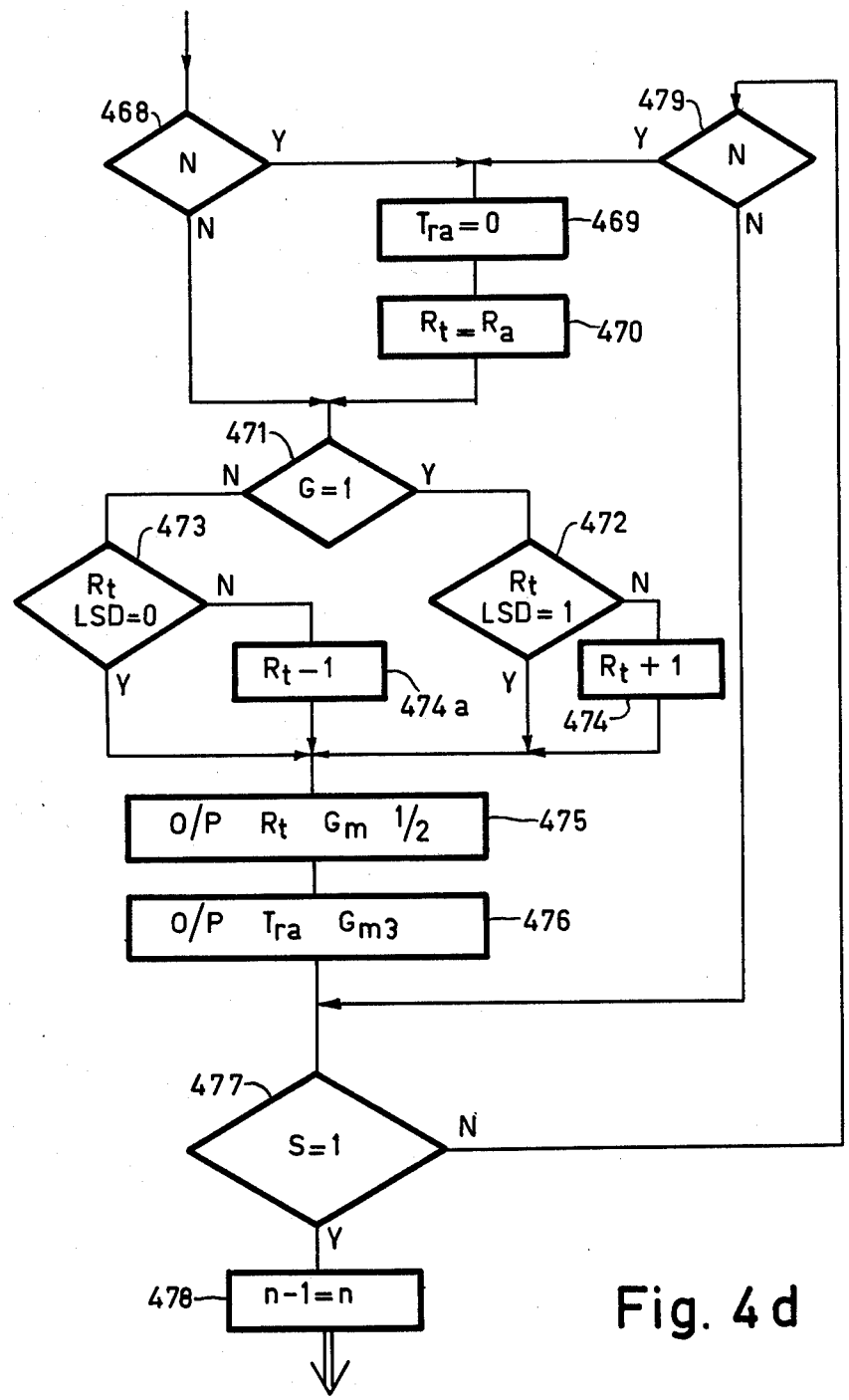

As shown in FIGS. 4a and 4b, the next instructions 418, 419, and 422 and decision 420 determine in accordance with equations 6a and 6b given hereinbefore a value for $R'_t$ which is then stored to be used subsequently in determining the throttle signal $R_t$. The value given by equation 6b (instruction 419) is only used for $R'_t$ if it is larger than that given by equation 6a, and this is determined in decision 420.

The stored values $T_c$ and $w'_d$ are then used by the next instruction 423 to determine a value $P_c$ for the power commanded which is to be used to determine a value for the target engine speed in accordance with hereinbefore derived equations 3a to 3d. Instruction 424 is first implemented to derive in accordance with equation 3a a value which is temporarily stored as $w_{et}$. Another value $w'_{et}$ is then derived in accordance with instruction 425 and equation 3b and is compared with the stored value of $w_{et}$ in decision 426. If $w'_{et}$ is larger than $w_{et}$ the stored value of $w_{et}$ is replaced by the value of $w'_{et}$ in accordance with instruction 427.

The microprocessor 300 now considers again the sign bit of the stored value of $w_d$ so as to implement decision 428 to determine which of the two possible values of $w_{et}$ given by equations 3c and 3d is positive and therefore the larger. If the sign of $w_d$ is positive, a new value $w'_{et}$ is now calculated in accordance with instruction 429 and equation 3c and is temporarily stored. If the sign of $w_d$ is not positive (but negative), a new value $w'_{et}$ is calculated in accordance with equation 3d and instruction 430. The values of $m$ and $m'$ are of course read from the ROM device 331.

Decision 431 is now implemented to determine whether $w_{et}$ is larger than the $w'_{et}$. If it is not, the value of $w_{et}$ is replaced by that of $w'_{et}$ in accordance with instruction 432. A value for $w_{et}$ in accordance with the equations 3a to 3d has now been calculated. This value $w_{et}$ is used with mode II operation of the CVG 11. However, if the CVG 11 is operating in its mode I, then as discussed hereinbefore it is desirable to increase the target engine speed by an increment $w$. This is effected with a decision 433 and an instruction 434. The decision 433 is based on a bit G stored in one of the read-write memories, for example device 332. In the preliminary programme G was preset in a "0" state, since mode I operation of the CVG 11 is used for starting the vehicle. The bit G is then up-dated in accordance with the single-bit used to form the output (from microprocessor 300 and store 371) which determines the system output signals Gm1 and Gm2. The microprocessor 300 therefore ascertains whether bit G is "0" or "1"; if it is "0", instruction 434 replaces the value of $w_{et}$ from equations 3a to 3d by a new value $w_{et}$ by adding $w$. The value $w$ is of course read from the ROM device 331. The final value derived for $w_{et}$ is of course temporarily stored in one of the read-write memories and is used in determining both outputs $R_t$ and $T_{ra}$.

The value for the throttle output $R_t$ is derived and temporarily stored in accordance with instruction 435 and equation 7 given hereinbefore, namely:

$$R_t = R'_t + k_2(w_{et} - w_e)/w_{em} + k_3 w_{et}/w_{em}.$$

In calculating $R_t$ from this equation the temporarily stored values of $R'_t$, $w_{et}$ and $w_e$ are used together with the values of $k_2$, $k_3$ and $w_{em}$ which are of course read from the ROM device 331.

A value $T_d$ for the torque transmitted to the drive shaft 14 is then derived and temporarily stored in accordance with instruction 436 and equation 4 given hereinbefore, namely:

$$T_d = T_c + k_1 R_a T_{em}[(w_e - w_{et})/w_{em}].$$

In calculating $T_d$ from this equation, the temporarily stored values of $T_c$, $R_a$, $w_e$ and $w_{et}$ are used together with the values of $k_1$, $T_{em}$ and $w_{em}$ which are of course read from the ROM device 331.

The next group of instructions 437, 440, and 442 and decisions 438, 439 and 441 involve checking, and if necessary resetting the Flag bit G in accordance with a newly derived value for the mode I/II single output bit, which will be subsequently written at the least significant digit (LSD) of the throttle control signal $R_t$. First a value $g$ for the ratio $w_d/w_e$ is derived in accordance with instruction 437 by division of the temporarily stored values $w_e$ and $w_d$. Then the existing value of the Flag bit G is read for decision 438. If it is "1" the next decision 439 checks whether it should be maintained at that value or reset to "0"; this reset is effected by instruction 440 only if the value $g$ is less than 0.33 in accordance with decision 439. Similarly if the existing value of Flag bit G as determined in decision 438 was not "1" (but "0"), the next decision 441 checks whether it should be maintained at that value or reset to "1"; this reset is effected by instruction 442 only if $g$ is larger than 0.33 in accordance with decision 441. *If the checked or reset value of G is* "1" (i.e. mode II operation of the CVG 11), then in accordance with the next instruction 443 the microprocessor adds "1" to the value $g$ to give a new value $g'$ which is equivalent to the factor $(w_d/w_e + 1)$ in the torque reaction equation 1 for mode II operation of the CVG 11. If however the checked or reset value of G is "0" (i.e. mode I operation), then the value $g'$ derived in accordance with instruction 444 is equivalent to the factor $(w_d/w_e - 1)$ in equation 1 for mode I operation. The value $g'$ is temporarily stored for subsequentuse in determining the torque reaction output $T_{ra}$.

The next group of instructions and decisions are concerned with possible modifications of the value $T_d$ (calculated in instruction 436) for use in the torque reaction equation 1. Most operational steps in this group are concerned with the control of a possible transient arising from the driver's possible variation in actuation of the accelerator 27. All the values of the variable parameters such as $R_a$, $t_e$, $w_e$, $w_d$, etc. which have been used in FIG. 4 until this stage of the programme have been based on the present measured valves, and the intermediate and final values of other parameters derived until this stage have been derived in accordance with these present values. The present value of any of these variable parameters and intermediate values can be written with for example a subscript $(n)$ to distinguish them from the previous values (measured or derived during the previous run of the programme) which may be written with for example a subscript $(n-1)$. For the sake of simplicity and clarity in writing the equations, the subscript $(n)$ has not and will not be used, so that parameters and calculated values with a subscript $(n-1)$ in FIG. 4 should be understood to refer to the value measured or derived during the previous run of the programme, whereas parameters and calculated values without a subscript $(n-1)$ should be understood to refer to the value measured or derived during the present run of the programme. (In this context the special status of the Flag bit G as read from memory for decisions 433 and 438 should be noted since it is determined by the value of the single output bit which was derived for the Gm½ output during the previous run of the programme; however for the sake of simplicity G has been written with no subscript in boxes 433 and 438. This also applies to Flags F(1), F(2), and F(3) which will be described hereinafter in connection with the modification indicated in FIG. 12).

Returning now to the next step in the programme, the instruction 450 subtracts the previous value $w_{e(n-1)}$ of engine speed from the present value $w_e$ to obtain a value $\Delta'w_e$ which is temporarily stored and is indicative of the acceleration or otherwise of the engine 1. The previous value $w_{e(n-1)}$ is of course read from the read/write memory in which it has been stored since the previous programme run. How (if at all) $\Delta'w_e$ is used subsequently is determined in decisions 451 and 452 which compare the present measured value $R_a$ with a history-dependent value $R'_{a(n-1)}$ derived during the previous programme run. The microprocessor 300 reads $R'_{a(n-1)}$ from the read/write memory (for example device 332) where it has been stored since the previous programme run, and also reads the constant value $r$ from the ROM device 331.

The microprocessor then adds $R'_{a(n-1)}$ and $r$ and implements decision 451.

If $R_a$ is greater than $R'_{a(n-1)} + r$, then a value $T'_d$ is derived in accordance with instruction 453 which implements equation 8a given hereinbefore, namely:

$$T'_d = T_{d(n-1)}[1 + (\Delta w_e - e)/w_e].$$

However in instruction 453 equation 8a has been modified to allow for the fact that, for a given acceleration rate of the engine $d w_e/dt$, the value of $\Delta'w_e$ is proportional to the time interval between pulses from the engine speed transducer 18'. Thus, $\Delta'w_e$ determined by instruction 450 is inversely proportional to $w_e$ and is therefore equal to $\Delta w_e/k_6 w_e$. Substituting in equation 8a gives equation 8c:

$$T'_d = T_{d(n-1)}[1 + k_6 \Delta'w_e - e/w_e] \tag{8 c}$$

This equation 8c is thus used in instruction 453.

In calculating the value of $T'_d$ from equation 8c in instruction 453, the temporarily stored values $w_e$ and $\Delta'w_e$ are used together with the constant values $k_6$ and $e$ which are read from ROM device 331 and the value $T_{d(n-1)}$ which is the value of $T_d$ which was used in equation 1 for calculating $T_{ra}$ during the previous programme run and which is read in the present programme run from the read/write memory (for example device 332) where it has been stored since the previous programme run. The microprocessor now implements decision 454 to decide whether to use $T'_d$ instead of the value $T_d$ (which was determined by instruction 436 and equation 4) in the torque reaction equation 1. If $T'_d$ is less or equal to than $T_d$, the temporarily stored value of $T_d$ is unchanged from that determined by instruction 436 and is used subsequently in equation 1. However, if $T'_d$ is larger than $T_d$, then the value of $T'_d$ is to be used as determined by instruction 455 which changes the temporarily stored value for $T_d$ so that it equals that for $T'_d$; in this case also (when $T'_d$ is larger than $T_d$) the microprocessor 300 implements a next instruction 456 to produce an up-dated value $R'_a$ in accordance with the hereinbefore given equation 9a namely:

$$R'_a = R'_{a(n-1)} + r.$$

Returning now to decision 451, if $R_a$ is not greater than $R'_{a(n-1)} + r$, then the microprocessor 300 then implements decision 452 to decide whether $R_a$ is less than $R'_{a(n-1)} - r$. If it is not, then instruction 460 is implemented to produce an up-dated value $R'_a$ equal to $R_a$ in accordance with equation 9c, after which decision 461 is implemented to determine whether the temporarily stored value of $T_c$ determined in instruction 417 is negative; if $T_c$ is negative (less than zero) instruction 462 ensures that this value is used in equation 1 instead of that which was determined for $T_d$ in instruction 436

Returning now to decision 452, if $R_a$ is less than $R'_{a(n-1)} - r$, then the microprocessor 300 implements instruction 463 to derive a value $T'_d$ in accordance with equation 8b. Instruction 463 is similar to instruction 453 except that $e/w_e$ is added instead of being subtracted as in equation 8c. The same substitution $\Delta'w_e = \Delta w_e/k_6 w_e$ as was used to convert equation 8a for instruction 453 is used to convert equation 8b for instruction 463. Decision 464 is then implemented (which is the opposite of decision 454), so that this value $T'_d$ is to be used for equation 1 only if it is smaller than the value for $T_d$ derived in accordance with instruction 436 and equation 4. If it is to be used, instructions 465 and 466 (which are similar to instructions 455 and 456) are implemented. Instruction 466 is in accordance with equation 9b in which $r$ is subtracted from $R'_{a(n-1)}$ instead of being added as in equation 9a and instruction 456.

Thus, from the decisions and instructions of the group 451 to 466 a single value $T_d$ is obtained for the torque to be transmitted to the drive shaft 14. This value $T_d$ is now used together with the temporarily stored value $g'$ to determine a value $T_{ra}$ in accordance with instruction 467 and equation 1, namely:

$$T_{ra} = T_d g'.$$

The next set of instructions and decisions is concerned mainly with setting up the correct values of the output parameters $T_{ra}$ and $R_t$.

Decision 468 is effected by reading the position of the switch 41 via gate 362 to determine whether or not neutral (N) is selected. If it is (Y-exit from 468), instruction 469 writes $T_{ra}$ as equal to zero (by replacing the temporarily stored value calculated in accordance with instruction 467) because no power should be transmitted to the drive shaft. Instruction 470 then sets the value of $R_t$ to equal the value of $R_a$ (by replacing the temporarily stored value calculated in accordance with instruction 435) so that the driver has direct control over the engine throttle. This facilitates starting the engine when neutral is selected.

As described hereinbefore the single bit output for Gm1 and Gm2 is written as the least significant digit (LSD) of the eight bit word used for output of the throttle control $R_t$. This is effected as follows in accordance with decisions 471, 472, 473 and instructions 474, 474a. If the value of Flag bit G is "1" (the Y-exit from 471) and the LSD of $R_t$ is not 1 (the N-exit from 472) the LSD of $R_t$ is changed to "1" by instruction 474. Similarly if $G = 0$ (the N-exit from 471) and the LSD of $R_t$ is not 0 (the N-exit from 473) the LSD of $R_t$ is changed to 0 by instruction 474a. Finally the resulting eight bit word which contains both $R_t$ and Gm½ output values is output from the microprocessor 300 to the store 371 in accordance with instruction 475. The eight bit word which contains both $T_{ra}$ and Gm3 (the sign bit of $T_{ra}$) is then output from the microprocessor 300 to the store 370 in accordance with instruction 476.

Decision 477 is effected by determining whether the signal in the sense terminal 303 is high ("1") or not. If it is high the signal from the engine speed transducer 18, 18' has finished gating clock pulses from clock 337 into the counter 338 thereby up-dating the value of $t_e$ and the programme is re-run. Instruction 478 causes all the present values of parameters to be transferred into the read-write store locations used for the parameter values for the previous run such as $T_{d(n-1)}$, $R'_{a(n-1)}$ and $w_{e(n-1)}$. The programme is then re-run as indicated by the arrow at the top of FIG. 4a. If the "SENSE" signal is not high (N-exit from 477) decision 479 is effected in the same way as decision 468. If neutral (N) is selected (Y output from 479) a revised value of $R_t$ is established by instruction 470 and the subsequent steps previously described, so that the driver retains direct control of the value of $R_t$. If neutral is not selected (N-exit from 479) the programme continues in the loop between decisions 477 and 479 until the next pulse from the engine transducer 18' causes the signal on the "SENSE" terminal 303 to be high (S = 1). The output of the monostable 340 is arranged to be high for a time which is always longer than the time between successive decisions 477 so that the Y-exit from 477 is always used when the monostable is triggered. However, as already stated, the monostable remains high for a time short compared with the time to run the main control programme (FIGS. 4a to 4d) as far as instruction 476. In this way the output information is revised twice (number of teeth $n = 2$) in each revolution which conforms to the minimum time in which significant action can be taken to control a 4-cylinder engine (2 power strokes per revolution).

As described hereinbefore (see FIGS. 5 and 6), in the Perbury gear-box the hydraulic pressure on the control piston 633 is also applied as an end load to the rolling assembly 12. The reason is that at high values of transmitted torque $T_d$ a high end thrust is required to avoid excessive shear in the oil film between the rollers and discs of the assembly 12. However a high end thrust gives rather high spin losses which are associated with shear in the oil film in the region around the effective point of contact. So if a high end load were maintained even when the transmitted power is low the spin losses would be disproportionately large. By using the control pressure also to end-load the rolling assembly the end-load is always matched to the transmitted torque provided that the rolling assembly 12 remains within its gearing range. However if the rollers reach the end of their travel a mismatch occurs since the control pressure and torque reaction are no longer balanced, the difference between these two forces being the force on an end stop. So ideally this should never be allowed to happen. In practice a small residual end load is provided separately from the control pressure which can prevent excessive shear (creep losses) when the control pressure is too low. In the interest of light load efficiency the residual end load should be small so the electronic control system 26 performs an important control task in keeping the rolling assembly 12 within its normal gearing range.

However, the CVG 11 may be subjected to shock loads due to abnormal operation of the vehicle, for example if the driven wheels are overbraked by operation of the conventional brake pedal or are rapidly accelerated by a good road surface after a skid. The gearing may then be forced to change at a greater rate than is normally possible, and the rollers may be forced against the end-stop. Substantial slip has to occur and this can cause damage if it is accomplished by a large temperature rise in the small volume adjacent to the bearing faces. In a traction-type gear-box such as the Perbury it can cause breakdown in the oil film between the rolling surfaces leading to for example scoring.

It will now be described how the CVG 11 can be readily protected against such damage by extending the electronic control strategy already proposed. This extension involves no additional components, only a modest elaboration of the logic used in the microprocessor 300. The information that the gear-box is being forced out of its normal operating range is obtained from the speed transducers 18' and 21' at the input and output of the gearbox 11, and protection is afforded by regulating output signal $T_{ra}$ to reduce the hydraulic control pressure. Since this pressure is also applied as an end thrust on the rolling assembly 12 its removal produces a large reduction in the viscosity of the oil film between the rolling surfaces. Substantial slip can and does therefore occur with little heat generation while the rollers steer to the gearing ratio imposed by the vehicle's operating conditions.

An appropriate strategy for protecting the CVG 11 against damage has three parts. In the first part the output signal $T_{ra}$ is reduced in magnitude when the rate of change of gearing exceeds a predetermined value. To avoid possible hunting the reduction should be progressive and the output signal $T_{ra}$ may fall essentially to zero when the rate of change of gearing exceeds a second predetermined value which is larger than the first. The magnitude of both the first and second predetermined values may be different depending on whether the rate of change of gearing $d(w_d/w_e)/dt$ is positive or negative. For example the second predetermined value may be written as a first function $f_1$ of $w_d$ and $w_e$ when $d(w_d/w_e)/dt$ is positive and as a second function $f_2$ of $w_d$ and $w_e$ when $d(w_d/w_e)/dt$ is negative. The first predetermined values may conveniently be written as a constant $k_9$ times the second value, $k_9$ being for example 0.8. The expressions used for $f_1$ and $f_2$ are convenient approximations to the limiting rate of change of gearing in normal operation of the CVG 11 as defined by the maximum steering angle of the rollers. The maximum rate of change of ratio given by the maximum steering angle of the rollers may be measured and the approximations $f_1$ and $f_2$ should each be chosen to give a smaller magnitude for the rate of change of ratio for all values of $w_d$ and $w_e$ which may occur during use of the vehicle.

In the second part the output signal $T_{ra}$ is maintained substantially zero for a sufficient time to allow the CVG to return to a condition of normal operation. This time may be determined from a reference speed ratio $g_r$. When either of the second predetermined values $f_1$ or $f_2$ is exceeded $g_r$ is set equal to the measured speed ratio $w_d/w_e$. The reference ratio $g_r$ is then varied at the limiting rate $f_1$ or $f_2$ depending on which limit was exceeded. Since the magnitudes of $f_1$ and $f_2$ are chosen to be always less than the actual maximum rates of change of synchronous speed of rollers and discs in the CVG 11 the reference ratio $g_r$ changes less rapidly than the speed ratio $w_d/w_e$ corresponding to zero slip between rollers and discs. Thus when $g_r$ equals the present speed ratio $g$ ($= w_d/w_e$) the rollers have certainly had enough time to steer to their synchronous track and the original output signal $T_{ra}$ can safely be reapplied.

In the third part the output signal $T_{ra}$ is increased to its original value. To avoid any unpleasant jerk a finite time is allowed for this, using for example a ramp of 0.2 seconds duration.

This strategy can be implemented by writing the output signal $T_{ra}$ as $$T_{ra} = A B T'_{ra} \tag{10}$$

where $T'_{ra}$ is the normal value of $T_{ra}$ given by instruction 467 of FIG. 4c.

The following expressions can be used for A and B (which normally equal unity).

$A = 0$ if $\Delta(w_d/w_e)/\Delta t$ is either greater than $f_1(w_d, w_e)$ or less than $f_2(w_d, w_e)$.

Since the time interval between successive measurements of $w_d$, $w_e$ is $t_e$ and $w_d/w_e = g$ this may be written as $$A = 0 \text{ if } g \text{ is greater than } g_{(n-1)} + f_1 t_e \tag{11a}$$

$$\text{or if } g \text{ is less than } g_{(n-1)} + f_2 t_e \tag{11b}$$

$g_{(n-1)}$ represents the value of $g$ in the previous time interval. The value $t_e$ read in instruction 401 in FIG. 4 can be temporarily stored so as to be available subsequently in the control programme for use in these overload protection relationships.

When either relation 11a or 11b is satisfied a reference ratio is set by writing $g_r = g$. The value of $g_r$ is then up-dated so that it varies at the rate given by $f_1$ or $f_2$ depending on which limit (11a or 11b) was reached. Thus if $\Delta g/\Delta t$ was positive and limit 11a was reached $$g_r = g_{r(n-1)} + f_1 t_e \tag{12a}$$

If $\Delta g/\Delta t$ was negative and limit 11b was reached $$g_r = g_{r(n-1)} + f_2 t_e \tag{12b}$$

The up-dating of the reference speed ratio $g_r$ continues until $g_r$ crosses the actual speed ratio $g$. Until $g_r$ crosses $g$, A is set equal to zero. When $g_r$ crosses $g$, A is set equal to unity and the output signal $T_{ra}$ is increased. Thus if $g_r$ is being up-dated according to relation 12a, then:

$$A = 0 \text{ while } g \text{ is greater than } g_r \tag{13a}$$

If $g_r$ is being up-dated according to relation 12b, then:

$$A = 0 \text{ while } g \text{ is less than } g_r \tag{13b}$$

When either relation 13a or relation 13b (as appropriate) no longer applies, A is set equal to 1 and B is given by $$B = t/0.2 \tag{14}$$

where $t$ is the time in seconds after A was set equal to 1. Relation 14 is used until B reaches 1 after which the value B = 1 is used and the transient is completed.

The strategy of progressively reducing the magnitude of the signal $T_{ra}$ when the first predetermined value of the rate of change of gearing is exceeded may be implemented by writing $A = 5\{1 - (g - g_{(n-1)})/t_e f_1\}$ if $g_{(n-1)}$ is greater than $0.8\, t_e f_1$ but less than $t_e f_1$ \hfill (15a)

$A = 5\{1 - (g - g_{(n-1)})/t_e f_2\}$ if $g - g_{(n-1)}$ is less than $0.8\, t_e f_2$ but greater than $t_e f_2$ \hfill (15b)

Figure 12:
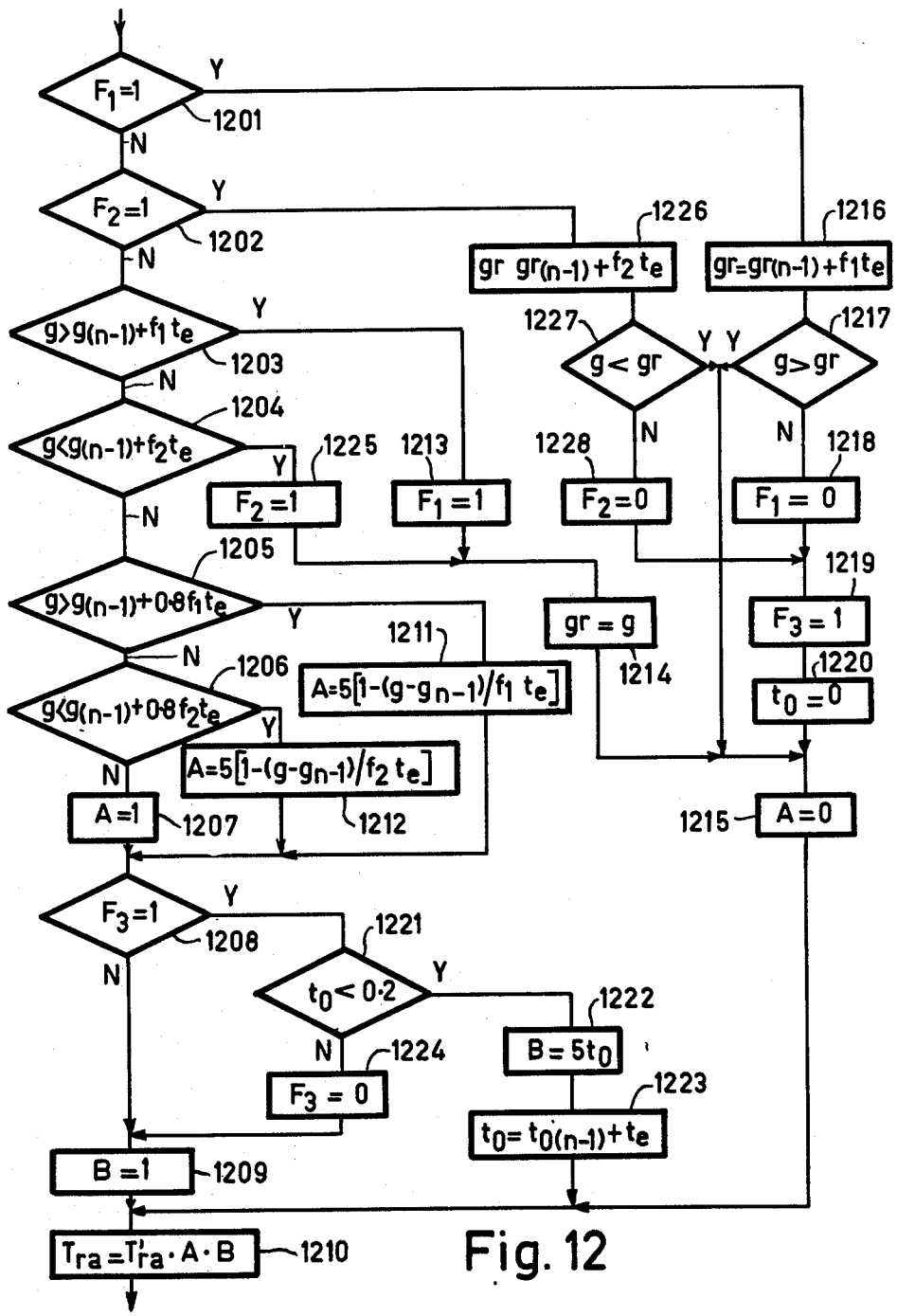
FIG. 12 is a flow chart of some additional operations which may be performed for overload protection in a modification of the control strategy indicated in FIG. 4.

The way in which the main control strategy given in FIG. 4 can be extended to provide protection to the CVG 11 against damage is indicated in FIG. 12. The flow chart shown in FIG. 12 is inserted between instructions 467 and 468 in FIG. 4. Thus, instruction 467 which calculates a value $T'_{ra}$ in accordance with equation 1 is now followed by a decision 1201 which determines whether or not a stored Flag bit $F_1$ has been set high ($F_1 = 1$) as a result of a previous run of the programme. On the first run through the programme the N exit from 1201 is followed and likewise the N exit from decision 1202 concerning Flag bit $F_2$ is followed; the setting of each of these Flags is described later. Decision 1203 determines whether or not the second (positive) predetermined value of the rate of change of gearing has been exceeded in accordance with relation 11a. If it has not been exceeded the N exit of 1203 is followed and decision 1204 determines whether the corresponding negative limit given by relation 11b has been exceeded. If not the N exit of 1204 is followed and decision 1205 determines whether the first predetermined value of rate of change of gearing given by the lower limit of relation 15a has been exceeded. If not the N exit of 1205 is followed and decision 1206 likewise determines whether the lesser limit of relation 15b has been exceeded. If not the N exit of 1206 is followed and instruction 1207 sets the parameter A equal to unity. This value of A is then of course temporarily stored in a read-write memory, for example the RAM 332. Decision 1208 determines whether Flag $F_3$ has been set ($F_3 = 1$) as a result of a previous run of the programme. If not the N exit of 1208 if followed and instruction 1209 sets the parameter B equal to unity. This value of B is similarly temporarily stored in the RAM 332. Instruction 1210 causes the value of $T_{ra}$ found from instruction 467 to be multiplied by the parameters A and B in accordance with equation 10. Since in this example both A and B equal unity $T_{ra}$ is unmodified by instruction 1210 which is the desired result during normal operation of the CVG 11.

Consider now the situation when the speed ratio $w_d/w_e$ ($= g$) is increasing abnormally rapidly due for example to the driven road wheels slipping when the vehicle is accelerating. Decision 1205 determines whether the first predetermined value of rate of change of gearing is exceeded in accordance with relation 15a. If so, the Y exit of 1205 is followed and instruction 1211 causes the value of A to be reduced in accordance with relation 15a. Likewise instruction 1212 in conjunction with decision 1206 causes A to be reduced in accordance with relation 15b if g is decreasing abnormally rapidly.

Returning to the situation in which g is increasing abnormally rapidly, decision 1203 determines whether the second predetermined value of rate of change of gearing is exceeded in accordance with relation 11a. If it is, instruction 1213 causes the Flag $F_1$ to be set ($F_1 = 1$) and instruction 1214 causes the reference ratio $g_r$ to be set equal to the present ratio $g$. Instruction 1215 then causes A to be set equal to zero. Instruction 1210 thus sets $T_{ra}$ equal to zero. On the next run through the programme the Y exit of 1201 is followed since the Flag $F_1$ has been set. Instruction 1216 causes the value of $g_r$ to be up-dated in accordance with equation 12a. The value of $g_{r(n-1)}$ is the previous value of $g_r$ which is stored in the $g_{r(n-1)}$ location of the RAM 332 as a result of instruction 478. Decision 1217 determines whether the present ratio g is still greater than the reference ratio $g_r$ in accordance with relation 13a. If so, the Y exit of 1217 is followed and instruction 1215 sets A to equal 0. On each successive pass through the programme the same route is followed through the flow chart in FIG. 12 until g is no longer greater than $g_r$. The N exit of 1217 is then followed and instruction 1218 causes the Flag $F_1$ to be reset ($F_1 = 0$). Instruction 1219 causes the Flag $F_3$ to be set ($F_3 = 1$) and instruction 1220 then causes the time $t_o$ associated with Flag $F_3$ (decisions 1208 and 1221) to be set to zero. On the next run through the programme of FIG. 12 the N exit of 1201 is followed since the Flag $F_1$ has been reset ($F_1 = 0$). The N exit of 1202 is also followed since Flag $F_2$ has not been set ($F_2 = 0$). Assuming that the magnitude of the rate of change of g is not abnormally large the N exits of decisions 1203 to 1206 will be followed. After instruction 1207 decision 1208 determines that the Flag $F_3$ has been set. The Y exit from 1208 is followed and decision 1221 determines that a time less than 0.2 secs has elapsed since the Flag $F_3$ was set. The Y exit of 1221 is followed and instruction 1222 sets B equal to 5 $t_o$ in accordance with equation 14. Instruction 1223 causes the value of $t_o$ to be incremented by the time $t_e$ between successive runs of the programme, the previous $t_o$ value $t_{o(n-1)}$ being available in the RAM 332 as a result of instruction 478. This route through the programme of FIG. 12 is followed until $t_o$ is no longer less than 0.2 sec. The N exit of decision 1221 is then followed and instruction 1224 then resets the Flag $F_3$ ($F_3 = 0$). Instruction 1209 then sets B equal to unity. Instruction 1210 causes the normal value of $T_{ra}$ to be used since A and B are both equal to 1.

A similar sequence of events occurs if g is decreasing abnormally rapidly. Decision 1204 determines whether the second predetermined value has been exceeded (relation 11b) and instruction 1225 sets the Flag $F_2$ ($F_2 = 1$). On the next pass through the programme the Y exit of decision 1202 is followed and instruction 1226 up-dates the reference ratio $g_r$ in accordance with equation 12b. Decision 1227 in conjunction with instruction 1228 causes the Flag $F_2$ to be reset when the reference ratio $g_r$ crosses the present ratio g in accordance with relation 13b. The Flag $F_3$ and time $t_o$ is then used to modify B for a period of 0.2 seconds in the way that has already been described.

It will be obvious that many other modifications are possible within the scope of the invention. As mentioned hereinbefore, the CVG 11 could alternatively comprise a DAF Variomatic transmission of the belt-drive type (see Automobile Engineer, December 1962, pages 494 to 500) in which the ratio of the drive could be arranged to be varied by varying the loading on the driving pulley using variable fluid pressure; this fluid pressure can be controlled by logic circuitry in a manner similar to that described herein, with the drive pulley loading providing the torque reaction for servoing purposes. Another possibility is to use a hydrostatic transmission arrangement consisting, for example, of a variable delivery pump and a variable displacement motor. Such a transmission arrangement naturally gives equal speeds and powers in forward and reverse and can advantageously be combined with an epicyclic transmission to give smaller reverse speeds and greater forward speeds, thus enabling hydrostatic units of reduced power rating to be used. In the case of hydrostatic transmissions using fixed displacement motors, output torque is directly proportional to pressure.

In the propulsion arrangement shown in FIG. 2, the signal $R_a$ is produced from a potentiometer 28 in response to actuation of the accelerator pedal 27. However the signal $R_a$ can be produced instead from a pressure transducer in response to actuation of the pedal 27. If desired, for example, the throttle 35 may be directly connected to the accelerator pedal 27 rather than controlled by the electronic control system 26; in this case no throttle output signal $R_t$ is calculated by the system 26, and it would be desirable for part of the engine braking to be controlled by actuation of the brake pedal (from which another input can be derived for system 26 using for example a pressure transducer).

The gearing select means 41 may also have one or more positions in which the target engine speed is higher than in the drive position (D). This may readily be achieved, for example, by multiplying the value of $w'_{et}$ given by instruction 429 by a predetermined value (for example multiplying by 2). This would serve to give a higher engine speed when the power commanded is low, thus reducing the time taken for the engine to reach a high speed when high power is commanded.

The system may be combined with an electronic fuel injection system in which the quantities $R_t$ and $w_e$ are used to determine the amount of fuel injected in each power stroke. A look-up table may for example be stored in the ROM 331 from which a time $t_f$ for opening the injector (or injectors) can be derived. To obtain sufficient accuracy for setting $t_f$ with a matrix of only for example 20 × 20 values of $R_t$ and $w_e$ a linear interpolation could be made between the two values of $t_f$ given by the adjacent values of $R_t$ and $w_e$ stored in the memory 331

The system may be combined with an electronic ignition system in which the ignition advance is determined by the values of $R_t$ and $w_e$ in accordance with a look-up table stored in the ROM 331.

The epicyclic gearing 13 may alternatively comprise two sets of epicyclic gears and only one pair of clutches so arranged that power is transmitted from the output of the rolling assembly 12 directly to the output shaft 14 in mode II (for medium and high forward speeds) and through the two sets of epicyclic gearing in mode I. This serves to reduce the power loss in the epicyclic gearing in the main gearing mode (mode II).

What we claim is:

1. A power arrangement for a wheeled vehicle having a drive shaft, said arrangement comprising an engine, continuously variable gearing between the engine and the drive shaft, power-command means operable by a vehicle driver to command a variation in engine power, and electronic control means for varying the torque transmitted by the continuously variable gearing, said control means being responsive to the engine speed $w_e$, the drive shaft speed $w_d$ and the extent of actuation $R_a$ of the power command means such that the torque transmitted to the drive shaft is a different function of engine speed $w_e$ for different values of $R_a$, said different functions corresponding to different power-load lines on an engine-power engine-speed graph, and said control means including means, responsive to increased actuation $R_a$ of the power-command means, for causing transition between a previous power-load line and a higher-engine-speed power-load line while maintaining transmitted power at least as high as the previous level of power, and responsive to reduced actuation $R_a$ of the power-command means, for causing transition between a previous power-load line and a lower-engine-speed power-load line while maintaining transmitted power at least as low as the previous level.

2. A power arrangement for a wheeled vehicle having a drive shaft, said arrangement comprising an engine, transmission means for coupling the engine to the drive shaft, said transmission means including continuously variable gearing, power-command means operable by a vehicle drive for demanding a variation in engine power, sensor means for providing signals indicative of the entrance speed $w_e$, the drive shaft speed $w_d$ and the extent of actuation $R_a$ of the power command means, actuator means for regulating the torque transmitted by said gearing, and electronic control means for receiving from said sensor means inputs indicative of $w_e$, $w_d$ and $R_a$ and for providing control signals to said actuator means responsive to said inputs for determining the torque transmitted to the drive shaft in accordance with the power produced by the engine as a function of the engine speed $w_e$ and one of a plurality of power-load lines for the engine, said load lines corresponding to respective extents of actuation $R_a$ of the power-command means such that for increasing values of $R_a$ the load line selected occurs at higher engine speeds $w_e$; said control means including means for causing transition responsive to increased actuation $R_a$ between the previously selected power-load line and a higher engine speed power-load line while maintaining transmitted power at least as high as the previous level of power, and in response to reduced actuation $R_a$ causing transition between the previous power-load line and a lower engine speed power-load line while maintaining transmitted power at least as low as the previous level.

3. An arrangement as claimed in claim 2 wherein said control means establishes load lines, corresponding to values of $R_a$ and $w_d$ greater than given values, which increase more steeply with engine speed than does a straight line on the engine-speed engine-power graph joining a region of maximum engine power to a region of lowest specific fuel consumption.

4. An arrangement as claimed in claim 3 wherein, in response to maximum actuation $R_a$ of the power-command means and values of $w_d$ greater than a second given value, a load-line is selected which increases at least twice as steeply with engine-speed as does a straight line on the engine-speed engine-power graph joining said region of maximum engine power to said region of lowest specific fuel consumption.

5. An arrangement as claimed in claim 2, wherein the slopes of the lines on the engine-power engine-speed graph increase for increasing respective values of $R_a$.

6. An arrangement as claimed in claim 2, wherein said means for causing transition, responsive to actuation of the power-command means to demand increased acceleration, so controls the continuously variable gearing that the torque transmitted to the drive shaft increases unless the acceleration of the engine is less than a predetermined value.

7. An arrangement as claimed in claim 6, wherein said means for causing transition includes means for comparing the present value $R_a$ of the power command means with a value $R'_a$ related to a previous value of $R_a$, and repeatedly modifying said value $R'_a$ so as to converge toward the present value of $R_a$.

8. An arrangement as claimed in claim 2, wherein said actuator means comprises a hydraulic pump, a solenoid operated pressure control valve and means for opposing torque reaction force on the continuously variable gearing responsive to hydraulic pressure determined by said valve, said pressure increasing a perpendicular component of force on the effective areas of contact between elements of said continuously variable gearing which provide the continuous variation of speed ratio.

9. An arrangement as claimed in claim 8, in which said hydraulic pressure is reduced if the magnitude of the rate of change of the engine speed/drive shaft speed ratio exceeds a predetermined value.

10. An arrangement as claimed in claim 9, in which a reference value of said speed ratio is derived if the magnitude of the rate of change of said speed ratio exceeds a second predetermined value, the reference value being repeatedly modified so as to converge towards the present value of said speed ratio, and the hydraulic pressure is maintained low until any difference between said reference value and said present value is less than a predetermined value.

11. An arrangement as claimed in claim 8, wherein control signals from said electronic control means so regulate the gearing ratio of the continuously variable gearing as to reduce differences between actual engine speed $w_e$ and a target engine speed associated with the extent of actuation $R_a$ of the power-command means, a target operating line selected for the engine to minimize low fuel consumption, and the limitations of gear ratio of the continuously variable gearing.

12. An arrangement as claimed in claim 11 in which said transmission means is operable in at least first and second modes, the first mode being adapted for reverse and low forward speed and the second for medium and high forward speeds, wherein said control means includes means responsive to said transmission being in the first mode for establishing a target engine speed greater than the target engine speed when the transmission is in the second mode.

13. An arrangement as claimed in claim 11, in which the torque $T_d$ transmitted to the drive shaft is related to the actual engine speed $w_e$ and the target engine speed $w_{et}$ by an equation of the form:

$$T_d = T_c + Y(w_e - w_{et})$$

where

Y is a factor which determines the rate of increase of $T_d$ with $w_e$, and $T_c$ is a function of $R_a$ and represents the torque commanded on the drive shaft by the driver's operation of the power command means.

14. An arrangement as claimed in claim 13, in which the output $R_t$ from said electronic control means for regulating the torque produced by the engine is related to the actual engine speed $w_e$ and the target engine speed $w_{et}$ by an equation of the form:

$$R_t = Y_1 T_c w_d + Y_2(w_{et} - w_e) + Y_3 w_{et} + Y_4$$

where $Y_1$, $Y_2$, $Y_3$ and $Y_4$ are constants, of which at least $Y_1$ and $Y_4$ may have different values for different ranges of $T_c w_d$, $w_d$ is the drive shaft speed, and $T_c$ is a function of $R_a$ and represents the torque commanded on the drive shaft by the driver's operation of the power command means.

15. An arrangement as claimed in claim 2 wherein said electronic control means includes means for providing an engine torque control signal, and said arrangement comprises a second actuator means associated with the engine for regulating the torque produced by the engine responsive to said engine torque control signal.

16. An arrangement as claimed in claim 15 wherein said engine torque control signal is varied to a value correspondinh to lower engine torque as the road speed falls below a predetermined value.

17. An arrangement as claimed in claim 15 in which said control means includes means for comparing actual engine-speed with a target engine-speed determined in accordance with the extent of actuation $R_a$, a target operating line for the engine for low fuel consumption and limitations of the gear ratio of the continuously variable gearing; and means for varying said engine torque control signal responsive to said comparison.

18. An arrangement as claimed in claim 2, additionally comprising a gearing-select means operable by a vehicle driver, and said electronic control means further includes means for regulating the continuously variable gearing so as to provide engine-braking responsive both to the extent of actuation $R_a$ of the power-command means and the gearing-select means.

19. An arrangement as claimed in claim 18, in which for small values of $R_a$ the extent of engine braking obtained is varied by changing the rear ratio in the continuously variable gearing while maintaining substantially zero actuation of the actuator means for determining engine torque.

* * * * *

UNITED STATES PATENT AND TRADEMARK OFFICE
CERTIFICATE OF CORRECTION

PATENT NO. : 4107776
DATED : August 15, 1978
INVENTOR(S) : JULIAN R.A. BEALE

It is certified that error appears in the above-identified patent and that said Letters Patent are hereby corrected as shown below:

In the "Foreign Application Priority Data"
Change "28896/76" to --28896/75--

"43598/76" to --43598/75--

Claim 11, line 48, delete "low"

Claim 16, line 36 "correspondinh" should be --corresponding--

Claim 19, line 56, "rear" should be --gear--

Signed and Sealed this

Twenty-second Day of May 1979

[SEAL]

Attest:

RUTH C. MASON
Attesting Officer

DONALD W. BANNER
Commissioner of Patents and Trademarks